(12) United States Patent
Higo

(10) Patent No.: US 11,471,754 B2
(45) Date of Patent: Oct. 18, 2022

(54) GAME PROGRAM, METHOD FOR CONTROLLING COMPUTER, AND COMPUTER

(71) Applicant: GREE, Inc., Tokyo (JP)

(72) Inventor: Yoshiyuki Higo, Tokyo (JP)

(73) Assignee: GREE, Inc., Tokyo (JP)

( * ) Notice: Subject to any disclaimer, the term of this patent is extended or adjusted under 35 U.S.C. 154(b) by 205 days.

(21) Appl. No.: 16/816,639

(22) Filed: Mar. 12, 2020

(65) Prior Publication Data

US 2020/0206605 A1 Jul. 2, 2020

Related U.S. Application Data

(63) Continuation of application No. 15/053,091, filed on Feb. 25, 2016, now Pat. No. 10,625,148.

(30) Foreign Application Priority Data

| Mar. 17, 2015 | (JP) | .................................... 2015-54015 |
| Mar. 17, 2015 | (JP) | .................................... 2015-54038 |
| Aug. 18, 2015 | (JP) | .................................. 2015-161174 |

(51) Int. Cl.
*A63F 13/00* (2014.01)
*A63F 13/822* (2014.01)
(Continued)

(52) U.S. Cl.
CPC .............. *A63F 13/00* (2013.01); *A63F 13/35* (2014.09); *A63F 13/822* (2014.09); *A63F 13/69* (2014.09)

(58) Field of Classification Search
CPC .......... A63F 13/00; A63F 13/69; A63F 13/35; A63F 13/798; A63F 13/822; A63F 13/86
See application file for complete search history.

(56) References Cited

U.S. PATENT DOCUMENTS

| 8,808,093 B1 * | 8/2014 | Reynolds .............. A63F 13/822 463/42 |
| 9,731,196 B2 | 8/2017 | Fujisawa et al. |

(Continued)

FOREIGN PATENT DOCUMENTS

| JP | 2001-334069 A | 12/2001 |
| JP | 2004-141435 A | 5/2004 |

(Continued)

OTHER PUBLICATIONS

Labyrinth of Chaos. Dragons-crown.fandom.com. Online. Jul. 26, 2014. Accessed via the Internet. Accessed Nov. 20, 2021. <URL: https://dragons-crown.fandom.com/wiki/Labyrinth_of_Chaos?oldid=7891> (Year: 2014).*

(Continued)

*Primary Examiner* — Thomas J Hong
*Assistant Examiner* — Carl V Larsen
(74) *Attorney, Agent, or Firm* — Maier & Maier, PLLC

(57) ABSTRACT

A game program when executed causes a computer to perform a process including storing a plurality of game areas each associated with one of a plurality of players including a subject player; receiving information concerning an own game area associated with the subject player and information concerning statuses of progress of the subject player and a plurality of other players different from the subject player through the game in the own game area; storing, in association with the own game area, the statuses of the progress of the subject player and the plurality of other players through the game in the own game area; comparing statuses of progress of the plurality of players through the game in the own game area; outputting display information for displaying a comparison result; and transmitting the display information to terminals of the plurality of players.

19 Claims, 23 Drawing Sheets

(51) Int. Cl.
*A63F 13/35* (2014.01)
*A63F 13/69* (2014.01)

(56) References Cited

U.S. PATENT DOCUMENTS

| | | | |
|---|---|---|---|
| 2006/0030407 A1 | 2/2006 | Thayer | |
| 2006/0121990 A1 | 6/2006 | O'Kelley, II et al. | |
| 2008/0078758 A1* | 4/2008 | Shimura | A63F 13/12 219/717 |
| 2008/0167122 A1* | 7/2008 | Maeda | A63F 13/577 463/30 |
| 2011/0265044 A1* | 10/2011 | Ganetakos | A63F 13/537 715/835 |
| 2012/0191502 A1* | 7/2012 | Gross | G06F 16/951 705/7.27 |
| 2013/0165233 A1* | 6/2013 | Wada | A63F 13/85 463/42 |
| 2013/0260896 A1* | 10/2013 | Miura | H04N 21/4788 463/42 |
| 2013/0288787 A1 | 10/2013 | Yoshie et al. | |
| 2013/0288788 A1* | 10/2013 | Lim | A63F 13/42 463/31 |
| 2014/0128155 A1 | 5/2014 | Morioka | |
| 2015/0367240 A1 | 12/2015 | Otomo | |

FOREIGN PATENT DOCUMENTS

| | | |
|---|---|---|
| JP | 2004-248816 A | 9/2004 |
| JP | 2009-112708 A | 5/2009 |
| JP | 2009-247421 A | 10/2009 |
| JP | 2012-45422 A | 3/2012 |
| JP | 2013-078380 A | 5/2013 |
| JP | 2013-152686 A | 8/2013 |
| JP | 2013-180002 A | 9/2013 |
| JP | 2013-198757 A | 10/2013 |
| JP | 2013-208223 A | 10/2013 |
| JP | 2014-008082 A | 1/2014 |
| JP | 2014-140778 A | 8/2014 |
| JP | 2014-150929 A | 8/2014 |
| JP | 2014-213080 A | 11/2014 |
| JP | 5797349 B1 | 10/2015 |
| JP | 2015-54015 A | 9/2016 |
| JP | 2017-23770 A | 2/2017 |

OTHER PUBLICATIONS

Arena. Summonerswar.fandom.com. Online. Mar. 7, 2015. Accessed via the Internet. Accessed Nov. 20, 2021. <https://summonerswar.fandom.com/wiki/Arena?oldid=39383> (Year: 2015).*

Japanese Office Action dated Apr. 6, 2021 in corresponding Japanese Application No. 2019-159774; 4 pgs.

Japanese Office Action dated Oct. 6, 2020 in corresponding Japanese Application No. 2019-159774; 9 pgs.

Strategy of "Dragon's Crown", Second step Guide, "Concerning adventure after normal clearing" 4Gamer.net [online], Sep. 27, 2013, searched on: Sep. 14, 2020, URL: https://www.4gamer.net/games/134/G013480/FC20130911001/.

Japanese Office Action dated Feb. 26, 2020 in corresponding Japanese Application No. 2017-004895; 5 pgs.

Cook, "Loot drop best practices", Gamasutra.com.; Online. Dec. 15, 2014. Accessed via the Internet. Accessed Jun. 10, 2019; URL: www.gamasutra.com/blogs/DanielCook/20141215/232300/Loot_drop_best_practices.php (Year: 2014); 7 pages.

Japanese Office Action dated May 7, 2015 in corresponding Japanese Application No. 2015-054038; 13 pgs.

Japanese Office Action dated Jul. 7, 2015 in corresponding Japanese Application No. 2015-054015; 9 pgs.

Japanese Office Action dated Dec. 1, 2015 in corresponding Japanese Application No. 2015-054015; 11 pgs.

Office Action dated Jul. 2, 2019, in corresponding Japanese Application No. 2017-109448; 6 pages.

Office Action dated Aug. 2, 2019, in corresponding Japanese Application No. 2017-004895; 6 pages.

"Gyo-Kai", "Action Force"; archive on Feb. 26, 2015; Dwango Co.,Ltd.; Nico Nico Pedia; including partial machine-generated English language translation; 7 pages. [online] Internet <URL: https://web.archive.org/web/20150226223754/http://dic.nicovideo.jp:80/a/%E3%81%8B%E3%81%8F%E3%82%8A%E3%82%88%E3%81%AE%E9%96%80> search on Jul. 24, 2019.

Office Action dated Dec. 4, 2018 in corresponding Japanese Application No. 2017-109448; 6 pages including English-language translation.

Office Action dated Dec. 7, 2018 in corresponding Japanese Application No. 2017-004895; 7 pages including English-language translation.

Dragon Quest X, Trying to take advantage of the support fellow, May 28, 2013, URL:http://web.archive.org/web/20130528171051/http://hiroba.dqx.jp/sc/public/playguide/guide_4_7.

4Gamer.net, "Dragon Quest X", published the party play other adventure-related system. It can be registered in the character of the player itself as AI character "support buddies", Oct. 27, 2011, URL:http://www.4gamer.net/games/139/G013991/20111021027/.

Office Action dated Apr. 26, 2016 corresponding application No. JP2016-031220; 8 pages.

Office Action dated Sep. 27, 2016 corresponding application No. JP2016-019678; 13 pages.

Office Action dated Dec. 20, 2016 corresponding application No. JP2016-174779; 14 pages.

"[Demon Try Live: Capture] First aim is to aim for Level 6!", Famitsu App, Published: Feb. 28, 2013 URL: https://app.famitsu.com/20130228_134692/.

* cited by examiner

FIG. 9

| PLAYER NAME | NUMBER OF FLOORS OF TOWER | NUMBER OF COINS | WEAPON | | ACCESSORY | | DECORATION | ACHIEVEMENT LIST |
|---|---|---|---|---|---|---|---|---|
| | | | WEARING | OWNED | WEARING | OWNED | | |
| PLAYER A | 12 | 123000 | ITM001 ITM002 ITM005 ITM010 | ITM006 ITM020 ITM021 | ACS001 ACS002 ACS005 ACS010 | ACS006 ACS020 ACS021 | 001.jpg 002.jpg | LIST 01 |
| | | | | | | | ... | ... |

| PLAYER NAME | NUMBER OF FLOORS OF TOWER | NUMBER OF COINS | WEAPON | | ACCESSORY | | DECORATION | ACHIEVEMENT LIST | |
|---|---|---|---|---|---|---|---|---|---|
| | | | WEARING | OWNED | WEARING | OWNED | | | |
| PLAYER A | 12 | 123000 | ITM001 ITM005 ITM010 | ITM006 ITM020 ITM021 | ACS001 ACS002 ACS005 ACS010 | ACS006 ACS020 ACS021 | 001.jpg 002.jpg | LIST 01 | ... |
| PLAYER B | 12 | 234000 | ITM001 ITM002 ITM003 | ITM006 ITM020 ITM021 ITM030 | ACS003 ACS007 | ACS008 ACS012 | | LIST 01 LIST 02 | ... |
| PLAYER C | 12 | 134000 | ITM001 ITM004 ITM020 | ITM003 | ACS004 | | 032.jpg | LIST 01 | ... |
| ... | ... | ... | ... | ... | ... | ... | ... | | ... |
| PLAYER X | 9 | 20123 | ITM003 ITM005 ITM029 | ITM001 ITM009 ITM010 ITM020 | ACS001 ACS002 | ACS008 ACS012 | 004.jpg | | ... |
| ... | ... | ... | ... | ... | ... | ... | ... | ... | ... |

| PLAYER NAME | NUMBER OF FLOORS OF TOWER | WEAPON WEARING | ACCESSORY WEARING | DECORATION | ... |
|---|---|---|---|---|---|
| PLAYER B | 12 | ITM001 ITM002 ITM003 | ACS003 ACS007 | | ... |
| PLAYER C | 12 | ITM001 ITM004 ITM020 | ACS004 | 0032.jpg | ... |
| PLAYER J | 6 | ITM002 ITM010 ITM020 | ACS001 ACS002 | 015.jpg | ... |
| ⋮ | ⋮ | ⋮ | ⋮ | ⋮ | ⋮ |

PLAYER C

PLAYER B

PLAYER A

| VISITED TOWER | NUMBER OF FLOORS REACHED | NUMBER OF COINS ACQUIRED | NUMBER OF VISITS | ACQUIRED WEAPON | ... |
|---|---|---|---|---|---|
| PLAYER B | 6 | 25600 | 4 | ITM348 | ... |
| PLAYER C | 3 | 6800 | 1 | | ... |
| PLAYER J | 12 | 270000 | 2 | | ... |
| ⋮ | ⋮ | ⋮ | ⋮ | ⋮ | ⋮ |

FIG. 15

| PLAYER A'S TOWER | | | | |
|---|---|---|---|---|
| PLAYER NAME | NUMBER OF FLOORS REACHED | NUMBER OF COINS ACQUIRED | NUMBER OF VISITS | ... |
| PLAYER B | 11 | 123456 | 4 | ... |
| PLAYER C | 6 | 100000 | 1 | ... |
| PLAYER X | 9 | 120123 | 2 | ... |
| ⋮ | ⋮ | ⋮ | ⋮ | ⋮ |

950

GAME PROGRAM, METHOD FOR CONTROLLING COMPUTER, AND COMPUTER

CROSS-REFERENCE TO RELATED APPLICATIONS

This application claims priority from U.S. patent application Ser. No. 15/053,091, filed on Feb. 25, 2016, entitled "GAME PROGRAM, METHOD FOR CONTROLLING COMPUTER, AND COMPUTER," which in turn claims priority to Japanese Patent Application No. JP2015054038A, filed on Mar. 17, 2015, to Japanese Patent Application No. JP2015054015A, filed on Mar. 17, 2015, and to Japanese Patent Application No. JP2015161174A, filed on Aug. 18, 2015, the entire contents of which are hereby incorporated by reference.

FIELD

The present invention relates to a game program capable of executing a game in a plurality of game areas each associated with one of a plurality of players, a method for controlling a computer, and a computer.

BACKGROUND

A technique has been disclosed for providing an enhanced entertainment experience for players who participate in a game by allowing a plurality of players to simultaneously proceed with the conquest of a dungeon created by a dominant player and providing special benefits (authority to rebuild the dungeon) to a player who has successfully conquered the dungeon the fastest (see, for example, Japanese Unexamined Patent Application Publication No. 2009-112708).

The technique of the related art described above requires individual players to simultaneously participate in a game online, and a game in which a small number of players participate is low on entertainment. There is another problem in that a dominant player has no means for presenting a dungeon that the dominant player has created to other players and therefore interaction among the players is difficult to promote.

SUMMARY

In view of the problems described above, the exemplary embodiments described herein may provide players of a game with a more highly entertaining game which can foster interaction among the players.

To this end, a game program, according to an exemplary embodiment, when executed, may allow a computer (e.g., a server or a terminal device serving as a host) to perform an area storage function for storing a plurality of game areas each associated with one of a plurality of players including a subject player; a reception function for receiving information concerning an own game area associated with the subject player, the own game area being updated in accordance with progress of a game in the own game area, and information concerning a status of progress of the subject player through the game in the own game area and statuses of progress of a plurality of other players different from the subject player through the game in the own game area; a status storage function for storing, in association with the own game area, the status of the progress of the subject player through the game in the own game area and the statuses of the progress of the plurality of other players through the game in the own game area; a comparison function for comparing statuses of progress of the plurality of players, who progress through the game in the own game area, through the game in the own game area; a display processing function for outputting display information for displaying a comparison result obtained by using the comparison function; and a transmission function for transmitting the display information to terminals of the plurality of players.

The game program when executed may further allow the computer to perform a reward providing function for determining another player who is provided with a reward based on the progress of the game in the own game area, in accordance with a result of comparison of the statuses of the progress of the plurality of other players through the game in the own game area.

In the game program, the reward provided by using the reward providing function may be a reward which is at least partially different for each of the plurality of game areas and which is specific to the own game area.

In the game program, the reception function may receive a status of progress of the subject player through the game in another game area different from the plurality of game areas, and the reward providing function may change, in accordance with the status of the progress of the subject player through the game in the other game area, the reward to be provided to another player who progresses through the game in the own game area associated with the subject player.

In the game program, the status storage function may further store information concerning a stage of the own game area. The comparison function may compare a stage of each of other game areas associated with the plurality of other players with the stage of the own game area, and the transmission function may transmit information concerning the own game area to another player associated with another game area whose stage satisfies a predetermined condition with respect to the stage of the own game area among the other game areas.

In the game program, the transmission function may transmit information concerning the own game area to another player associated with the subject player on any other service.

In the game program, the transmission function may transmit information concerning another game area associated with another player to the subject player in accordance with the progress of the other player through the game in the own game area.

In the game program, the game program when executed may further cause the computer to perform a map generation function for generating, for each of the plurality of players, a map for the plurality of game areas. The map generation function may output map information for displaying, on the map of the subject player, information concerning another game area associated with another player in which the subject player is able to progress through the game.

In the game program, the reception function may periodically receive information concerning the game, the information changing in accordance with the progress of the subject player through the game.

A method for controlling a computer according to another exemplary embodiment includes an area storing step of storing a plurality of game areas each associated with one of a plurality of players including a subject player; a receiving step of receiving information concerning an own game area associated with the subject player, the own game area being updated in accordance with progress of a game in the own game area, and information concerning a status of progress of the subject player through the game in the own game area and statuses of progress of a plurality of other players different from the subject player through the game in the own game area; a status storing step of storing, in association with the own game area, the status of the progress of the subject player through the game in the own game area and the statuses of the progress of the plurality of other players through the game in the own game area; a comparing step of comparing statuses of progress of the plurality of players, who progress through the game in the own game area, through the game in the own game area; a display processing step of outputting display information for displaying a comparison result obtained in the comparing step; and a transmitting step of transmitting the display information to terminals of the plurality of players.

A computer according to still another exemplary embodiment includes an area storage unit that stores a plurality of game areas each associated with one of a plurality of players including a subject player; a receiving unit that receives information concerning an own game area associated with the subject player, the own game area being updated in accordance with progress of a game in the own game area, and information concerning a status of progress of the subject player through the game in the own game area and statuses of progress of a plurality of other players different from the subject player through the game in the own game area; a status storage unit that stores, in association with the own game area, the status of the progress of the subject player through the game in the own game area and the statuses of the progress of the plurality of other players through the game in the own game area; a comparison unit that compares statuses of progress of the plurality of players, who progress through the game in the own game area, through the game in the own game area; a display processing unit that outputs display information for displaying a comparison result obtained by the comparison unit; and a transmitting unit that transmits the display information to terminals of the plurality of players.

A game program according to still another exemplary embodiment, when executed, causes a computer (e.g., a terminal device) to perform a reception function for receiving information concerning one or more other game areas other than a subject player, each of the one or more other game areas being associated with one of one or more other players; a display function for displaying information concerning an own game area associated with the subject player and the one or more other game areas each associated with one of the one or more other players; an input function for accepting operation input information from the subject player through a predetermined input device; a progress function for causing a game to progress in the own game area associated with the subject player or one of the one or more other game areas each associated with one of the one or more other players in accordance with the operation input information; an update function for updating the own game area in accordance with the progress of the game in the own game area; and a transmission function for transmitting, to a predetermined device (e.g., a server or another terminal device serving as a host), information concerning the own game area updated by using the update function and a status of progress of the subject player through the game in the updated own game area. The reception function receives, from the predetermined device, information concerning a comparison result obtained by comparing a status of progress of the subject player through the game in the own game area with a status of progress of each of a plurality of the other players through the game in the own game area. The display function displays the received comparison result.

In the game program, the update function may decorate the own game area with a decorative element in accordance with operation input information from the subject player.

A game program according to an exemplary embodiment may be implemented by at least the following three configurations: (a) a configuration in which a computer functions as a client device (e.g., a smartphone, a personal computer, etc.) and the game program is executed by the client device, (b) a configuration in which a computer functions as a server device (e.g., a mainframe, a cluster of computers, any computer capable of providing a game service to an external device, etc.), part or all of the game program is executed by the server device, and the result of the executed process is returned to a client device, and (c) a configuration in which processes included in the game program are performed by a client device and a server device in a distributed manner, as necessary.

Accordingly, the display function implemented by the game program may (a) output information (e.g., display information) to an external display device (e.g., a display unit included in a mobile terminal) connected to the computer so as to be capable of communicating with the computer via a predetermined network (e.g., the Internet) to cause the display device to display a game screen, or (b) output display information to a display device included in the computer to cause the display device to display a game screen.

In addition, (a) a client device connected to the computer so as to be capable of communicating with the computer via a predetermined network (e.g., the Internet) may include a predetermined input device, the client device may transmit operation input information input via the predetermined input device (e.g., a touch panel included in a mobile terminal) to the computer, and the information processing function implemented by the game program on the computer may obtain the operation input information, or (b) the computer may include a predetermined input device and the information processing function may obtain the operation input information via a predetermined input device.

According to an exemplary embodiment, the results of play of a game by a plurality of players in a game area are presented to a player of the game, and the player progress through the game in their own game area to update the own game area. This can provide an attractive incentive for other players to repeatedly conquer the own game area. Accordingly, a player of a game can be provided with a higher entertaining game which can foster interaction among players.

BRIEF DESCRIPTION OF THE DRAWINGS

Exemplary

Exemplary

Exemplary

Exemplary

Exemplary

Exemplary

Exemplary

Exemplary

Exemplary FIG. 9 illustrates an example of a table illustrating information concerning the status of a player A's progress through the game.

Exemplary FIG. 10 illustrates an example of a table illustrating the status of each player who progresses through the game in the player's tower, which is stored in a server.

Exemplary

Exemplary

Exemplary

Exemplary FIG. 13 illustrates an example of a table illustrating information concerning other players' towers that each player has visited.

Exemplary FIG. 14 illustrates an example of a table that table that stores the status of individual players who progress through the game in the player A's tower.

Exemplary FIG. 15 is a table illustrating the status of other players who progress through the game in the player A's tower, which is stored in a mobile terminal of the player A.

Exemplary

Exemplary

Exemplary

Exemplary

Exemplary

Exemplary

Exemplary

Exemplary

Exemplary

Exemplary

Exemplary

DETAILED DESCRIPTION

Figure 1:
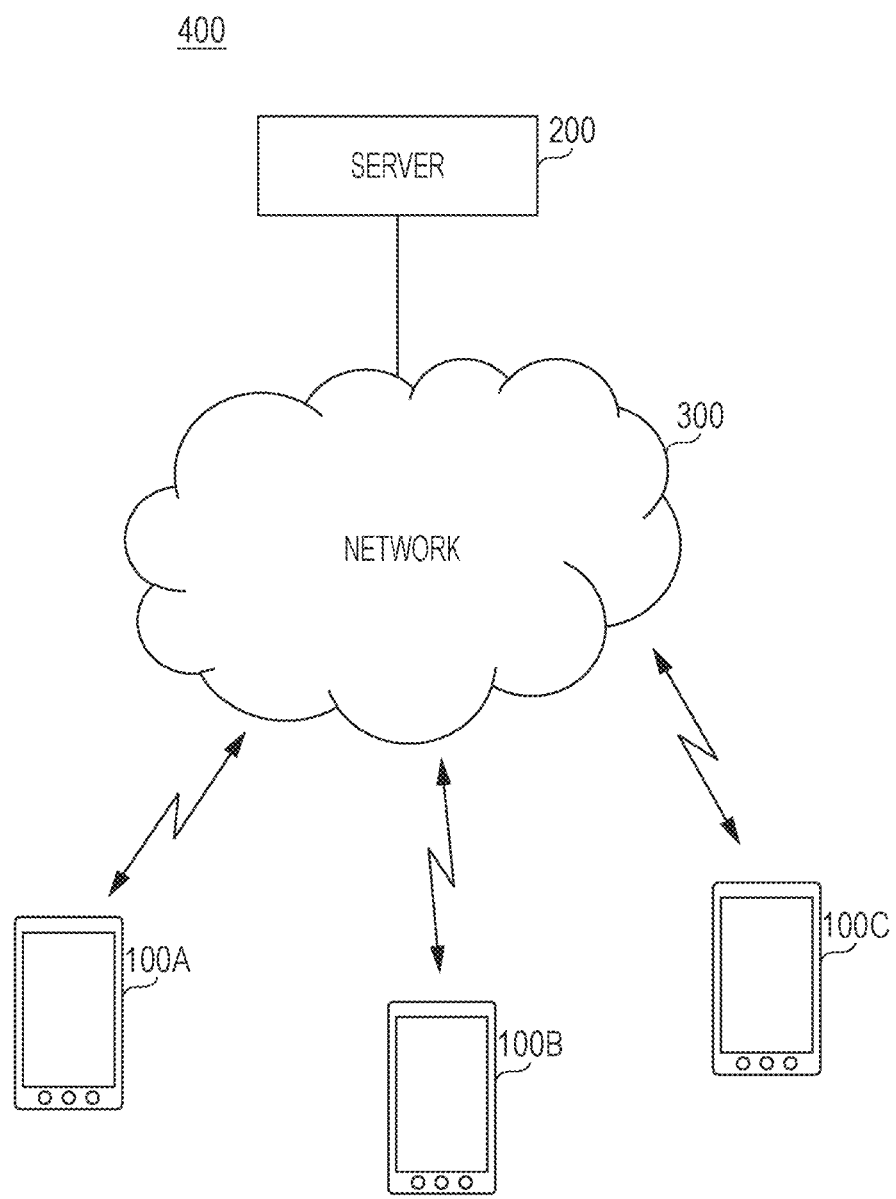
FIG. 1 is a schematic diagram of a game system configuration according to a first embodiment of the present invention.

First, a brief description will be given of an overview of a game implemented by a game program according to a first exemplary embodiment.

In the virtual space of a game, "players' towers" (game areas) each associated with one of a plurality of players may be present, and an individual player may be able to play the game not only in the player's tower but also in any "other player's tower" associated with any other player. A plurality of players of the game may be able to asynchronously play the game in a plurality of towers that are present. The term "game in a tower" refers to a game that encourages a player character of a player to explore the inside of the tower in a limited number of turns and defeat an enemy character that the player character encounters while acquiring items to proceed with the conquest of the tower. When the player successfully conquers floors up to the top floor of the "player's tower", the player can increase the number of floors of the tower. Accordingly, each player can increase the number of floors of the "player's tower" (or any "other player's tower" for another player). Thus, even if a player conquers floors up to the top floor of any "other player's tower" at a certain point in time, the number of floors of the "other player's tower" may be larger the next time the player logs in to the game than when the player last conquered the top floor of the "other player's tower".

In the virtual space of the game, additional game areas other than the above-described towers associated with the individual players, such as a "common tower", a "battle tower", an "event tower", and a "quest", may be present. The game areas such as the towers and the quest described above may be game areas not associated with any players but managed on the server (supervisor) side, and can be visited by any players. In any of these game areas, every player aims to conquer the top floor or the bottom level by causing the player character to explore the inside. In the "common tower", players can encounter and greet each other while exploring the inside, or a plurality of players are ranked according to the state of conquest of the "common tower". The "battle tower" is a tower in which players fight against each other, and an opponent that a player character encounters in the tower may be any other player character. In addition, each player can explore a game area such as any of the towers described above together with, a duplicate of any other player character, which has been acquired by the player through a random lottery ("gacha"), as a companion character or the like.

The "event tower" is a tower related to an in-game event held for a certain period. The "event tower" may be a tower that appears in a predetermined condition in accordance with the progress of each player through the game, and allows the player to gain a special reward by exploring the inside. The "quest" may allow a player character of a player to encounter an enemy character different from that in any of the towers described above or may allow the player to gain a special reward. Furthermore, an "achievement list" that is a list of items achievable for a player of the game may be set, and a reward may be provided to the player when the player has achieved an item on the list. The items in the achievement list may include, for example, "log in to the game on ten or more days", "take out 50 or more items in total from all the towers", "encounter other players ten or more times within a tower", and "visit other players' towers ten or more times". The foregoing is a brief summary of the game.

An exemplary embodiment may be described in detail hereinafter with reference to some drawings. First, a description will be given of a configuration in which a computer according to an exemplary embodiment functions as a mobile terminal (client device) and a game program according to an exemplary embodiment is executed on the mobile terminal as a native application (native game). In some further examples, the mobile terminal may be capable of accessing a server, as necessary, and downloading and using information on the progress of a game, for example information concerning the results of play of the game by other players, information concerning any other player having a friendship with the player who uses the mobile terminal on a social networking service (SNS), information concerning items assigned to other players or characters controlled by other players, or any other applicable information as desired.

FIG. 1 is a schematic diagram of a game system configuration according to a first embodiment of the present invention. As illustrated in FIG. 1, a game system 400 may include a plurality of mobile terminals, for example 100A, 100B, and 100C, and may include a server 200. The server 200 is connected to the mobile terminals 100A to 100C via a network 300. In FIG. 1, only three mobile terminals are illustrated, for simplicity of illustration. It is to be understood that more than three mobile terminals may be present.

The mobile terminals (computers) 100A to 100C are information processing devices each capable of executing a game program including processes described below. Mobile terminals may be any of a variety of devices so long as the devices are capable of executing the processes described below, and may be terminal devices such as smartphones, tablet terminals, home game consoles, mobile phones, or personal computers, or other electronic devices, as desired. According to an exemplary embodiment, the game program may be executed by a multifunction device (such as a smartphone) having a display (display unit), an input screen on which a touch is detectable, a memory, and one or more processors capable of executing one or more programs stored in the memory.

Figure 2:
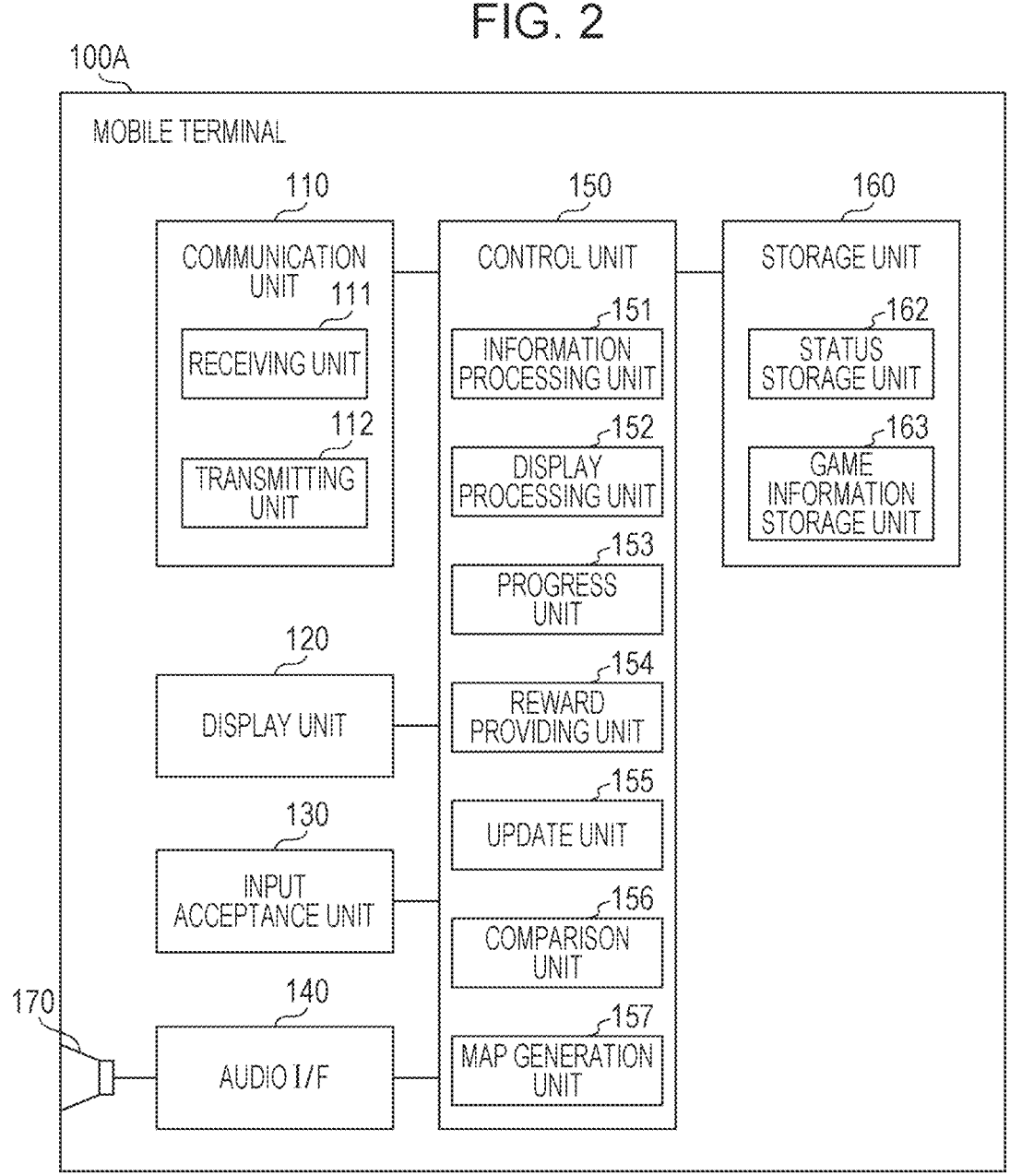
FIG. 2 is a block diagram illustrating an example of a mobile terminal according to the first embodiment of the present invention.

FIG. 2 is a block diagram illustrating an example configuration of a main part of the mobile terminal 100A. While a description is given here of the configuration of the mobile terminal 100A, other mobile terminals, such as mobile terminals 100B and 100C, may have a configuration similar to that of the mobile terminal 100A.

As illustrated in FIG. 2, the mobile terminal 100A includes a communication unit 110, a display unit 120, an input acceptance unit 130, an audio interface (I/F) 140, a control unit 150, a storage unit 160, and a speaker 170.

The communication unit 110 includes a receiving unit 111 and a transmitting unit 112, and may communicate with the server 200 via the network 300. The communication may be implemented via wired or wireless connection, and any communication protocol that makes mutual communication feasible may be used. As described in detail below, the receiving unit 111 receives information concerning other game areas associated with other players. The receiving unit 111 further receives information concerning a result of comparing the status of a player who progresses through a game in their own game area (the player's tower) with that of a plurality of other players. Information concerning the status of the plurality of other players may be obtained by a predetermined terminal device. For example, according to an exemplary embodiment, it may be obtained by the server 200, or may be obtained by a terminal device serving as a host, such as, for example the mobile terminal 100B or any other mobile terminal (not illustrated). The transmitting unit 112 may transmit, to the predetermined terminal device, information concerning the own game area, which may be updated by an update unit 155 described below, and the status of the player who progresses through the game in the updated own game area.

The display unit 120 is a device that displays a game screen. As described in detail below, the display unit 120 may display a comparison result obtained by a comparison unit 253 of the server 200. In this embodiment, the display unit 120 may be a liquid crystal display. In FIG. 2, the input acceptance unit 130 and the display unit 120 are illustrated as separate functions of the input acceptance unit 130 and the display unit 120. However, according to an exemplary embodiment, these components may be formed into a single unit; for example, the input acceptance unit 130 may be a touch panel and the display unit 120 may be a liquid crystal display.

The input acceptance unit 130 may be configured to accept an operation input by the player. In this embodiment, the input acceptance unit 130 may be a touch panel capable of multi-touch detection. The input acceptance unit 130 may detect a touch position touched by the player with their finger or any other pointing device such as a stylus, and may transmit information concerning the coordinates of the detected position to an information processing unit 151. In this embodiment, the input acceptance unit 130 may accept an operation input by the player on a game medium (character), or other operations such as taps on various icons and menu buttons displayed on the display unit 120. An operation input by the player may not necessarily be accepted by using a touch operation on the touch panel, and may be accepted by, for example, the player pressing a predetermined input key, or by another indication of acceptance, as desired.

The audio I/F 140 may be an interface for the speaker 170 or earphones (not illustrated). When reproducing sound effects, background music (BGM), or the like in a game, the control unit 150 may signal audio to be output from the speaker 170 or the earphones via the audio I/F 140.

The control unit 150 may be a processor configured to control the individual components of the mobile terminal 100A. The control unit 150 includes the information processing unit 151, a display processing unit 152, a progress unit 153, a reward providing unit 154, the update unit 155, a comparison unit 156, and a map generation unit 157. The information processing unit 151 may obtain coordinate information transmitted from the input acceptance unit 130 at predetermined time intervals, and may output information on the sequence of coordinates to the individual components as a trajectory. The display processing unit 152 may convert display data transmitted from the information processing unit 151 or any other functional unit into pixel information, and may output the pixel information to the display unit 120.

A brief description will be given of the function of the other components of the control unit 150, which will be described in detail below. The progress unit 153 may receive operation input information from the player through the input acceptance unit 130, and may be configured to cause a game to progress in the own game area (the player's tower) associated with the player or in any other game area (any other player's tower) associated with any other player in accordance with the received operation input information. The progress unit 153 also allows another player associated with any other game area whose stage satisfies a predetermined condition regarding the stage of the own game area to progress through the game in the own game area. Information concerning other game areas (other players' towers) is transmitted from the server 200 and is received by the receiving unit 111. The term "stage of a game area", as used here, refers to information indicating the growth of the game area, and may be represented by any parameter of the game area that may be changed (updated) in accordance with the process of a player in the game, such as height, width, or depth.

The progress unit 153 further allows any other player associated with the player on any other service to progress through the game in the own game area. The term "any other service", as used here, is used to include an SNS and any other game. In addition, the progress unit 153 allows the player to progress, in accordance with the progress of another player in the game in the own game area, through the game in any other game area associated with the other player. The progress unit 153 further allows the player to progress through the game in a game area different from a plurality of game areas associated with a plurality of players. Information concerning such other players' towers is transmitted from the server 200 and is received by the receiving unit 111.

The reward providing unit 154 may be configured to provide a reward to a player of the game on the basis of the progress of the game caused to progress by the progress unit 153. The update unit 155 may update the own game area on the basis of the progress of the game in the own game area. Further, the update unit 155 may decorate the own game area with a decorative element in accordance with operation input information from the player. The map generation unit 157 generates a map for a plurality of game areas corresponding to the player.

The storage unit 160 includes a status storage unit 162 and a game information storage unit 163. The storage unit 160 may be or may include any recording medium such as a hard disc drive (HDD), a solid state drive (SSD), or a flash memory, or any other recording medium as desired. Storage unit 160 may have a function of storing various programs or various kinds of data necessary for the mobile terminal 100A to operate. That is, the storage unit 160 may store information (a game program and data) on a game downloaded by the player from a game server over the network 300 and installed into the mobile terminal 100A.

The status storage unit 162 stores the status of the player's progress through the game in the own game area, which is updated by the update unit 155. The information stored in the status storage unit 162 includes information concerning a stage of the own game area. The game information storage unit 163 may store game information data necessary for the player to progress through a game, such as items acquired by the player, the image of a player character of the player, and decorative elements for the own game area.

Figure 3:
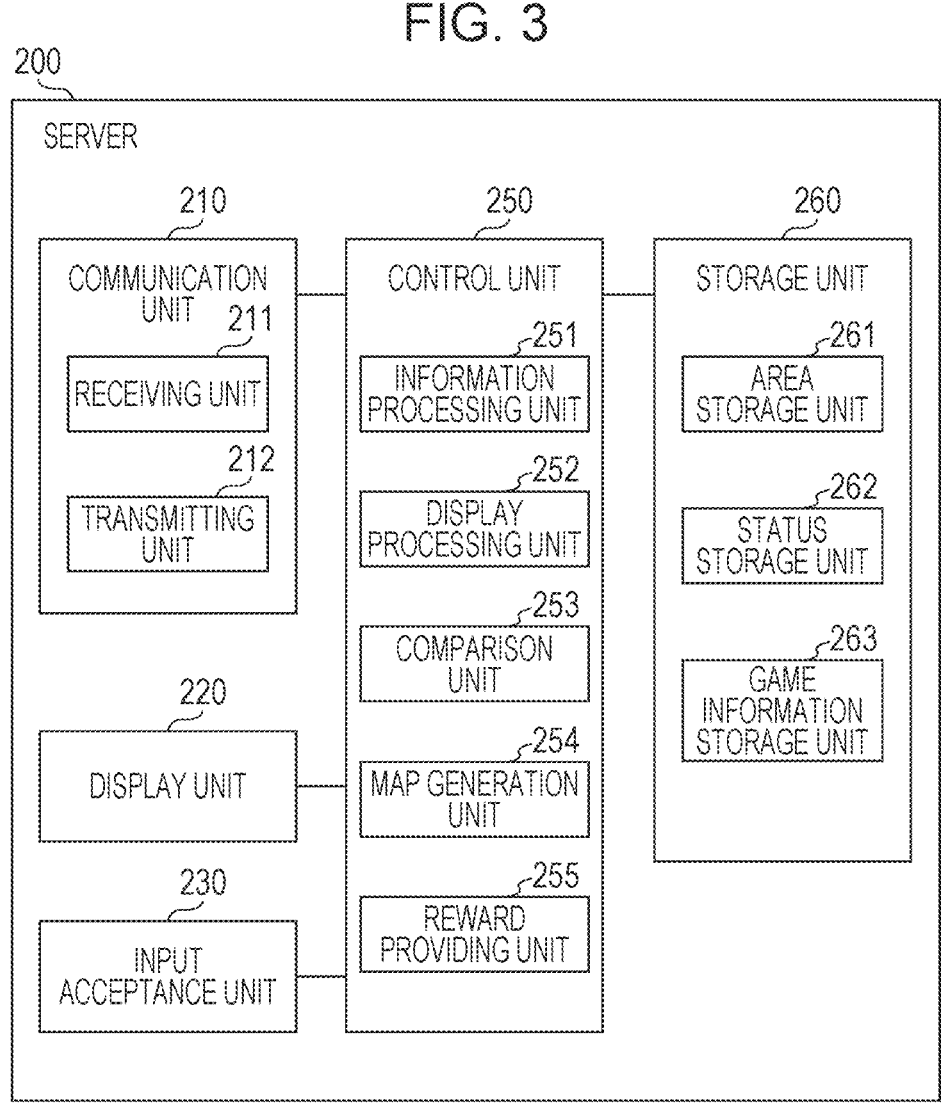
FIG. 3 is a block diagram illustrating an example of a server according to the first embodiment of the present invention.

FIG. 3 is a block diagram illustrating an example configuration of a main part of the server 200 according to an exemplary embodiment. As illustrated in FIG. 3, the server 200 includes a communication unit 210, a display unit 220, an input acceptance unit 230, a control unit 250, and a storage unit 260.

The communication unit 210 includes a receiving unit 211 and a transmitting unit 212, and has a function of performing communication with the mobile terminals 100A to 100C via the network 300 in accordance with an instruction given from the control unit 250. That is, the communication unit 210 transmits and receives data regarding the game to and from the mobile terminals 100A to 100C. As described in detail below, the receiving unit 211 may receive information concerning an own game area (a player's tower) associated with a player, which is updated in accordance with the progress of the game in the own game area, and information concerning the status of the player and a plurality of other players different from the player who progress through the game in the own game area. The receiving unit 211 may further receive the status of the player's progress through the game in a game area (such as the common tower, the event tower, or the quest) different from a plurality of game areas associated with the plurality of players (the individual players' towers). In addition, the receiving unit 211 may periodically (such as when the player logs in, when the game screen of the player transitions, or at certain time intervals) receive information concerning the game, which changes in accordance with the progress of the player in the game.

The transmitting unit 212 may transmit display information for displaying a comparison result obtained by the comparison unit 253 (described in detail below) to terminals of the plurality of players. The transmitting unit 212 further transmits, to any other player associated with a player on any other service, information concerning the player's own game area. In addition, the transmitting unit 212 transmits information concerning any other game area associated with another player to a player in accordance with the progress of the other player through the game in the player's own game area.

The display unit 220 may be implemented by a liquid crystal display or a monitor, and may display information necessary for the game supervisor to control the server 200. The input acceptance unit 230 may be implemented by a keyboard or a touch pad, and may accept operation input necessary to control the server 200.

The control unit 250 is a processor that may be configured to control the individual components of the server 200. The control unit 250 may include an information processing unit 251, a display processing unit 252, the comparison unit 253, a map generation unit 254, and a reward providing unit 255. The information processing unit 251 may perform various processing operations on the operation input information input from the input acceptance unit 230 and information transmitted and received by the communication unit 210. The display processing unit 252 may process various kinds of data to be displayed on the display unit 220. Further, the display processing unit 252 may output display information for displaying a comparison result obtained by the comparison unit 253 (described in detail below). The comparison unit 253 may compare the status of the progress of the game in an own game area between a plurality of players who progress through the game in the own game area. The comparison unit 253 may further compare the stage of any other game area associated with another player with the stage of the own game area. The map generation unit 254 may be configured to generate a map of the virtual space of the game for each player who plays the game. For example, the map generation unit 254 may generate, for each of the plurality of players, a map for a plurality of game areas, and may output map information for displaying, on a map for a player, information concerning any other game area associated with another player in which the player is able to progress through the game.

The storage unit 260 may be configured to store or hold various programs and data necessary for the server 200 to operate. The storage unit 260 may include an area storage unit 261, a status storage unit 262, and a game information storage unit 263. The area storage unit 261 stores a plurality of game areas each associated with one of the plurality of players. The status storage unit 262 stores information on a game area of each player who plays the game, and information on the status of each player who progresses through the game. For example, the status storage unit 262 may store the status of a player and a plurality of other players who progress through the game in the player's own game area in association with the own game area. When a game area associated with a player is updated in accordance with the progress of the player through the game in the game area, the status storage unit 262 stores the updated game area. That is, the status storage unit 262 also stores information concerning the stage of the own game area. The game information storage unit 263 stores various kinds of data necessary for the game to progress. According to an exemplary embodiment, the storage unit 260 may be or may include any of various recording media such as an HDD, an SSD, and a flash memory.

Figure 4:
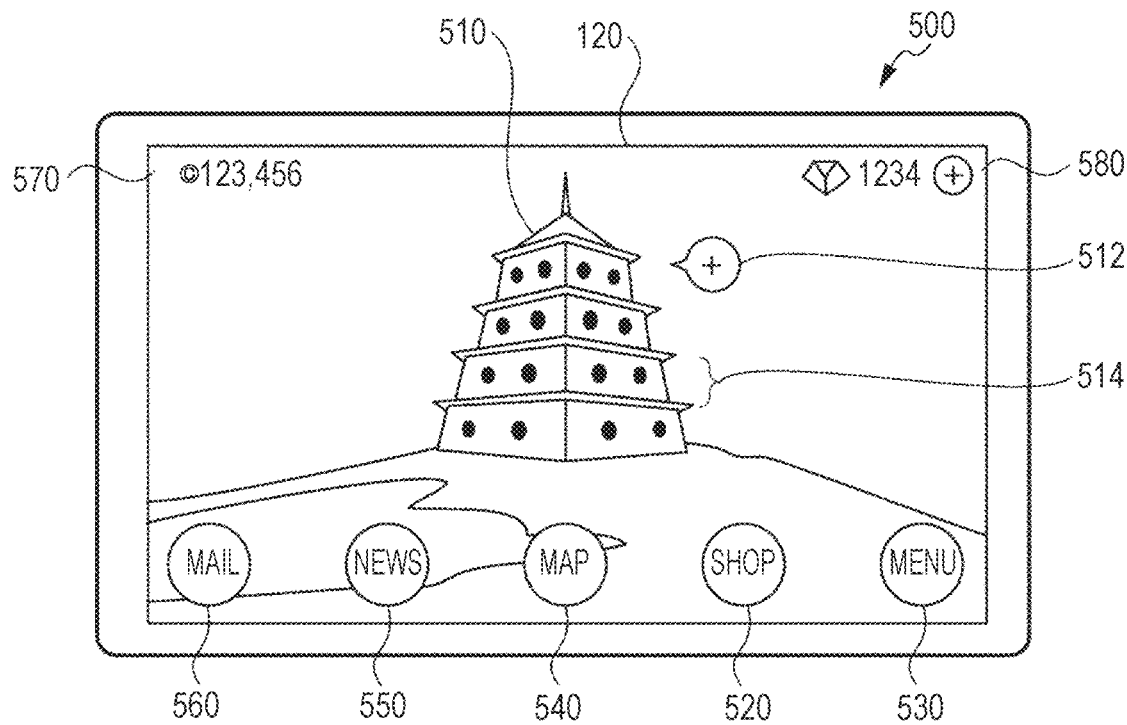
FIG. 4 illustrates an example game screen (start screen) according to the first embodiment of the present invention.

An exemplary embodiment of a game implemented by a game program may be described with reference to FIGS. 4 to 7. FIG. 4 is a diagram illustrating an example game start screen displayed on the display unit 120 of the mobile terminal 100A. In the following description, a player who owns the mobile terminal 100A is represented by a player A, a player who owns the mobile terminal 100B is represented by a player B, and a player who owns the mobile terminal 100C is represented by a player C. While the description will be given of the mobile terminal 100A, the same applies to the mobile terminals 100B and 100C.

As illustrated in FIG. 4, a start screen 500 shows the player A's tower (own game area) 510, a shop ("SHOP") button 520, a menu ("MENU") button 530, a map ("MAP") button 540, a news ("NEWS") button 550, a mail ("MAIL") button 560, the number of coins 570, and the number of gems 580. Information (such as a program or image data) for displaying the start screen 500 may be stored in the game information storage unit 163 of the mobile terminal 100A. The display processing unit 152 may generate information for displaying the start screen 500 by using the information stored in the game information storage unit 163, and may output the generated information to the display unit 120.

Tapping on the tower 510 allows the player A to make their player character, namely, a player character A, enter the tower 510. The player A makes the player character A move within the tower 510 in a limited number of turns and fight against an enemy character that the player character A has encountered. The player character A wins the fight to obtain an experience value and grow, and can further acquire a coin. In addition, there is a treasure chest within the tower 510, and the player character A can acquire an item in the treasure chest as a reward. The acquired item may be a set of arms or a defensive weapon such as protective clothing or an accessory such as a necklace or a ring, which determines the characteristic values of the player character A, such as defense ability, attack ability, speed, and luck. The player A can set an item or accessory with which the player character A is to be equipped in order to defeat an enemy character. When a fight is set up between the player character A and an enemy character, the progress unit 153 may perform parameter calculations based on the characteristic values of the player character A, which are determined based on the equipment of the player character A, such as defense ability, attack ability, speed, and luck, and the characteristic values of the enemy character, and determines the amounts of damage that the respective characters receive. The character by which the total amount of damage received exceeds the total number of hit points (HP) possessed is the loser.

An exemplary embodiment of the game described above may proceed as follows. First, the input acceptance unit 130 accepts a tap operation or slide operation of the player A (detects a tap operation or a slide operation on the touch panel), and transmits coordinate information to the information processing unit 151. The information processing unit 151 transmits information to the progress unit 153, such as whether an instruction given by the player A indicates a tap and, if the instruction indicates a slide, in which direction to slide. The progress unit 153 determines the direction of movement of the player character A on the basis of the slide operation performed by the player A, and issues an instruction to update the display screen (such as the appearance of an enemy character or a treasure chest or the transition to a tower inside screen). As described above, the progress unit 153 also performs parameter calculations for a battle against an enemy character.

According to an exemplary embodiment, the tower 510 may be a three-story tower in the initial state of the game. When a player wins a battle ("boss battle") against a boss enemy on the top floor of the tower 510, a button 512 for increasing the number of floors of the tower 510 may be displayed. The player A may tap on the button 512 and spend a preset coin to add a floor to every three floors 514. An enemy character on a higher floor may have higher defense ability or attack ability, and the characteristic values of an item which can be acquired may be set higher. The information described above may be stored in the game information storage unit 163. Boss enemies may be located on every three floors (such as the third, sixth, and ninth floors) of the tower 510. A player who wins a boss battle can escape from the tower 510 carrying acquired items with them. A player whose number of turns reaches zero or who loses a boss battle or escapes from the tower 510 during exploration is not allowed to take acquired items from the tower 510.

According to an exemplary embodiment, the status of the player's progress through the game in the player's tower is transmitted from the transmitting unit 112 to the server 200. The status of the player's progress through the game includes a stage of the game (such as the number of floors of the player's tower, and the equipment of the player character controlled by the player). The server 200 receives from each player (for example, the players A to C of the mobile terminals 100A to 100C) the status of the player's progress through the game in the corresponding player's tower, and stores the status in the status storage unit 262. The status of each player who progresses through the game is transmitted to the server 200 periodically such as at the timing when the player updates the height of the tower or when the player finishes (or logs out of) the game.

According to an exemplary embodiment, a plurality of players of the game may each be associated with a tower such as that on the start screen 500, and each player can visit another player's tower (in an exemplary embodiment, any other player's tower) to play a battle game such as that described above in the other player's tower. When visiting any other player's tower, each player may need to spend coins which are virtual currency. It may be appreciated that, in some exemplary embodiments, information concerning any other player's tower is transmitted from the server 200, and is received by the receiving unit 111. The received information is stored in the game information storage unit 163 to allow the player to play the game in the other player's tower (information on which other player's tower is transmitted from the server 200 to each player will be described below).

As described above, the height of a tower associated with a player changes with the progress of the player through the game. Information such as the number of floors of each player's tower is transmitted to the server 200, and the latest state of each player's tower is stored in the storage unit 260 of the server 200. The storage unit 260 also stores information transmitted to each player, which is related to any other player's tower (for example, this may include information regarding which player can progress through the game, and in which other player's tower the player can progress through the game). Accordingly, if any other player's tower that a player visited has been updated (if the number of floors has been increased), the server 200 transmits information indicating the update of the other player's tower to a mobile terminal of the player. Based on the information, the player can receive (download) information concerning the other player's tower which has been updated, by using the receiving unit 111 of the mobile terminal 100A. In this manner, even if a player visited once and explored and conquered any other player's tower, the number of floors of the other player's tower may have been increased the next time the player logs in. An enemy character that the player encounters and the item that the player can acquire changes depending on the height of the tower, which can give the player an incentive to visit and conquer the other player's tower multiple times. This can result in the growth of interaction among players.

Referring back to the start screen 500, according to an exemplary embodiment, tapping on the shop button 520 allows the player A to display a screen for a virtual shop in the game. In the virtual shop, the player A can use acquired coins or gems to purchase an item or summon a companion character. The coins and gems are virtual currency that a player spends to purchase an item in the game, summon a companion character, or enter any other player's tower or the battle tower. The menu button 530 is a button for displaying a menu screen to make the game progress. The menu screen shows, for example, a game score (e.g., the maximum number of floors reached, etc.) that is information concerning the status of the player's progress through the game in the player's tower, any other player's tower, the common tower, or the battle tower, a button to switch to a screen for setting the equipment of the player character, and a button to switch to an item management screen.

According to an exemplary embodiment, the map button 540 is a button to transition to a map screen on which any other player's tower that the player A can visit or the common tower is displayed. The news button 550 allows a message to be displayed in accordance with the progress of the game. Examples of the message may include "expansion (adding a floor) of a tower is available", "another player visited this tower", "the functions available to the player A have been released", and "information on any other player's tower has been updated". These messages are generated by the display processing unit 152 in accordance with an instruction from the progress unit 153. Among the messages described above, the messages related to other players are generated based on information concerning the other players and the other players' towers, which is transmitted from the server 200. The news button 550 may also allow ranking (described below) to be displayed. While the ranking is displayed, the color of the news button 550 is changed or a label with the ranking is displayed on top of the news button 550 to allow the player to see the display of the ranking at a glance. The map button 540 and the news button 550 are each displayed with an exclamation mark if there is any information that remains unchecked by the player A. The shop button 520 and the map button 540 are displayed when the tower 510 is nine or more floors high. A process based on such a condition is also performed by the progress unit 153.

The mail button 560 may be displayed by the display processing unit 152 in accordance with information received from the server 200 when there is any announcement from the supervisor of the game. Tapping on the mail button 560 allows the player A to display the announcement on the display unit 120. Start screen 500 may also show a number of coins 570, which may indicate the total number of coins that the player A currently owns. The number of gems 580 shows the number of gems owned by the player A. According to an exemplary embodiment, tapping on a plus (+) button located near the number of gems 580 allows the player A to make the display unit 120 transition to a gem purchase screen.

Although not illustrated in FIG. 4, according to an exemplary embodiment, the player A can decorate the player's tower 510 with a decorative element. For example, the player A can color the exterior wall of the player's tower 510 or stick an image on the wall. The player A can also decorate the tower 510 with a picture or image hanging on the interior wall. Such decoration is performed by the update unit 155 updating the player A's tower so that the player A's tower is decorated with an image and the like selected by the player A in accordance with an instruction given by the player A. Information concerning the player A's tower which has been updated may be transmitted to the server 200, and the server 200 may store the information concerning the player A's tower in the storage unit 260. The decorated tower may also be displayed in the same fashion on mobile terminals of other players who have received the information concerning the player A's tower from the server 200. Accordingly, a player can decorate the player's tower at their own preference to make the player's tower appeal to other players, thereby providing the player with a more entertaining experience.

Figure 5:
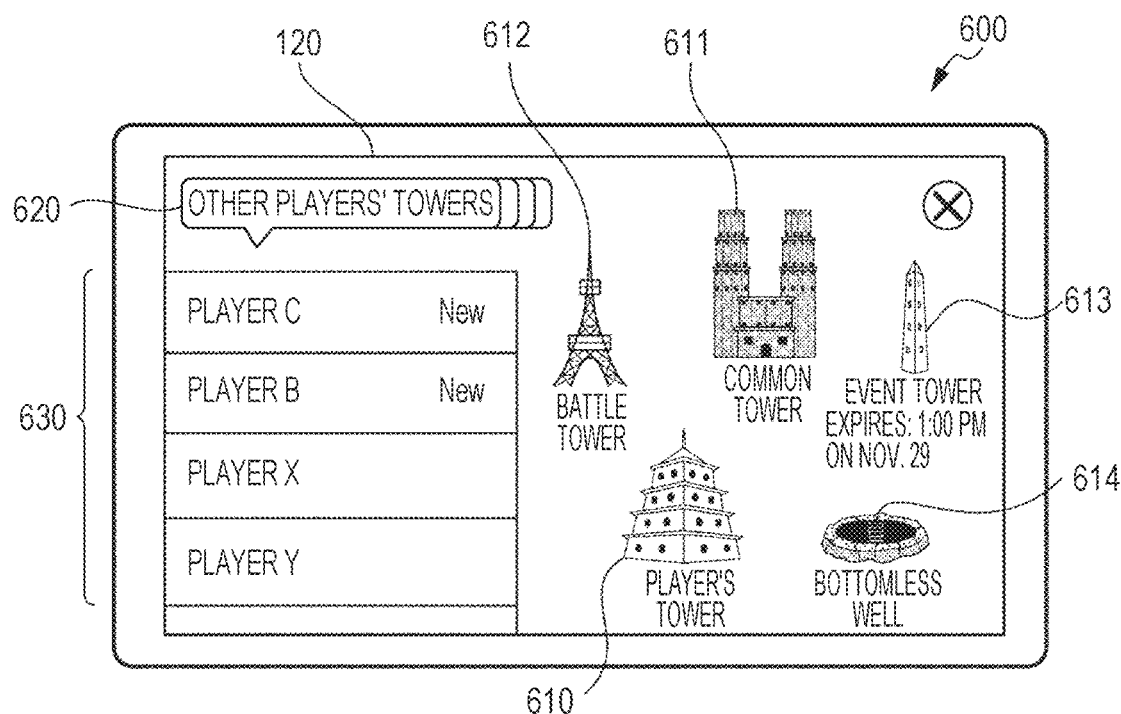
FIG. 5 illustrates an example game screen (map) according to the first embodiment of the present invention.

According to another exemplary embodiment, a map may be displayed by the player A tapping on the mail button 540. FIG. 5 is a diagram illustrating an example of a map displayed on the display unit 120. The illustrated map may be generated by the map generation unit 157 of the mobile terminal 100A. Alternatively, the map generation unit 254 of the server 200 may generate a map, and map information for displaying the map may be transmitted to the mobile terminal 100A. As illustrated in FIG. 5, a player's tower (the player A's tower) 610, a common tower 611, a battle tower 612, an event tower 613, and a quest (bottomless well) 614 are displayed on a map 600. A tab menu 620 and a list 630 are also displayed. The player A can tap on the map 600 to select the destination.

Other towers may be displayed on the map 600. As described above, the player's tower 610 is a game area associated with the player A, and the height of the tower 610 can be increased in accordance with the conquest of the player A. The common tower 611 is a tower that every player can conquer. As described above, each player aims to conquer the top floor while fighting against an enemy character that the player encounters within the common tower 611. The player may be required to spend a coin in order to enter the common tower 611, and can acquire more valuable reward items as they proceed to a higher floor. The height of the common tower 611 does not change in accordance with a user operation. On the contrary, the supervisor of the game may change the height of the common tower 611 in accordance with the progress of each user through the game. In the common tower 611, the player may encounter another player character, which may include a player character whose player is playing the game at the same time, or a player character whose player is not currently playing the game. The player may encounter another player character which is selected by the game program and displayed.

The battle tower 612 may be a tower in which the player character A of the player A fights against another player character of another player. According to an exemplary embodiment, the battle tower 612 may not be displayed on the map 600 until the player's tower 610 meets a predetermined condition; for example, when the player's tower 610 becomes twelve or more floors high, the player A may be able to explore the battle tower 612. That is, the map generation unit 157 generates a map on which the battle tower 612 is displayed, in accordance with the progress of the game caused to progress by the progress unit 153. In the battle tower 612, the player A may encounter another player character as an opponent character. Another player who controls the other player character that the player A encounters may not necessarily be playing the game at the same time, and any other player character satisfying a predetermined condition is selected by the game program (any other player character satisfying a predetermined condition is selected by the server 200, and information concerning the other player character is transmitted) and is displayed to the player A. Examples of the predetermined condition for selecting an opponent include situations where the status of the opponent's progress through the game is similar to the status of the player A's progress through the game. For example, these may be situations where the opponent's tower has a height in a range of plus/minus one floor with respect to the height of the player A's tower. As described above, the player A can explore the inside of the battle tower 612 together with, as a companion character, a duplicate of any other player character which has been acquired by the player A through a random lottery ("gacha").

The event tower 613 may be displayed on the map 600 when a predetermined condition is satisfied. For example, when the player A wins battles in the battle tower 612 and completes the conquest of the top floor or when the player A is ranked in top ten according to the battle record in the common tower 611, the player A may be able to explore the event tower 613. That is, the comparison unit 253 of the server 200 compares the battle records of the individual players in the common tower 611 to rank the players, and, when a predetermined condition is satisfied, information concerning the event tower 613 (information such as the appearance, enemy characters, and items) is transmitted from the server 200 to the mobile terminal 100A of the player A. The map generation unit 157 generates a map on which the event tower 613 is displayed, on the basis of the received information concerning the event tower 613. In the event tower 613, for example, the player A can be encouraged to acquire items in absence of an enemy character or can obtain a special reward by winning a fight against a special enemy character that appears, in accordance with the content of the event. The quest (bottomless well) 614 may be a game space in which the player A can encounter an enemy character different from that in the common tower 611 or the player's tower 610 or can acquire a special item.

The tab menu 620 shows "Other players' towers" that the player A can visit—for example, by selecting the tab—and also shows "Exploration history", "Favorites", and "Towers accessible with a ticket", which are not illustrated in FIG. 5. In FIG. 5, the list 630, which is a list of "other players' towers" that the player A can visit, is illustrated. As illustrated in FIG. 5, the player A can visit at least "the player C's tower", "the player B's tower", "a player X's tower", and "a player Y's tower".

As described above, according to an exemplary embodiment, a map for other players' towers that a player can visit is generated and displayed to the player. This allows the player to understand other players' towers that the player can visit at a glance. In addition, tapping on a point on the map allows the player to readily visit any other player's tower corresponding to the point, which can motivate the player to visit other players' towers and facilitate the promotion of interaction among players.

A description will be given here of any other player's tower that the player A can visit. If the height of the player A's tower satisfies a predetermined condition (e.g., nine or more floors), the player A encounters another player character while exploring the player A's tower, and the other player character hands out a map for the other player's tower to the player A. Player A may be able to visit this tower, for example upon retrieving the map from the tower. When the player A wins a boss battle in the player A's tower and successfully escapes from the player A's tower carrying acquired items with them, Player A can take the map. The other player's tower for which the player A has taken out the map is displayed on the list 630 as one of the other players' towers that the player A can visit.

Selection of a player character that may be encountered by player A while exploring player A's own tower may be based on, for example, whether or not the player of that player character has a tower having a stage that satisfies a predetermined condition. A player whose tower has a stage satisfying a predetermined condition for a particular stage of player A's tower may be selected from among a plurality of other players. Examples of the predetermined condition may include situations where the height of the other player's tower is within a range of plus/minus one floor with respect to the height of the player A's tower. The selection of another player is performed by determining, based on the status of the individual players who progress through the game (including the stages of the players' towers) which are received by the server 200 from the mobile terminals of the corresponding players, whether or not the predetermined condition is satisfied, by using the comparison unit 253.

Here, a level of any other player's tower having a height equivalent to that of a given player's tower, such as the characteristic values of an enemy character that appears, is equivalent to that of the given player's tower. This enables the conquest of the other player's tower to have the right level, which is not too difficult or too easy, for the given player to enjoy the game, and can maintain the motivation of the given player to play the game.

Alternatively, another player who controls another player character that the player A encounters while exploring the player A's tower may be another player character of another player who has visited or conquered the player A's tower. Information concerning another player who has visited or conquered the player A's tower may be transmitted from the server 200 to the mobile terminal 100A of the player A, or may be transmitted directly from a mobile terminal of the other player to the mobile terminal 100A of the player A. As described above, according to an embodiment of the present invention, a player may be provided with information on another player who has visited the player's tower, which can motivate the player to visit the other player's tower. This can result in the growth of interaction among players.

In addition, the reward that other players gain in a player's tower or the number of coins required for other players to enter the player's tower may be changed in accordance with the relation of each of the other players to the player's tower (such as the number of times the other player has visited the player's tower or whether or not the other player has conquered the player's tower). For example, the number of coins required for any other player to visit a player's tower may be reduced as the number of times the other player has visited the player's tower increases. Furthermore, any other player who has visited a player's tower more times may be provided with a more special reward (with lower probability of occurrence) in the player's tower.

In addition, other players who can play the game in the player A's tower may be other players associated with the player A on any other service. For example, another player associated with the player A on any other service such as an SNS, that is, another player having a friendship with the player A, may be allowed to play the game in the player A's tower. In this case, when the player A shares information concerning the player A's tower on an SNS, a Uniform Resource Locator (URL) which enables the game to start in the player A's tower is publicly available on the SNS. Clicking on the URL allows the other player having a friendship with the player A to play the game in the player A's tower.

The other services described above may include another game. For example, another player who is in the same team as the player A in any other battle game or who is a friend of the player A may be allowed to play the game in the player A's tower.

In this way, a player's friend on an SNS or in any other game is allowed to explore the player's tower, which can provide an attractive incentive for the player and the friend to enjoy the game together.

As in the player A's tower, the game in any other player's tower also aims to encourage a player to fight against an enemy character while acquiring items and to win a boss battle against a boss enemy on the top floor of the other player's tower. As in the player A's tower, the player who wins boss battles against boss enemies on every three floors and successfully escapes from the other player's tower can take items acquired in the other player's tower. In addition, coins acquired by the player in the other player's tower can not only be taken with them but can also be recorded in a battle record in the other player's tower, and the battle record is transmitted to the server 200.

Figure 6:
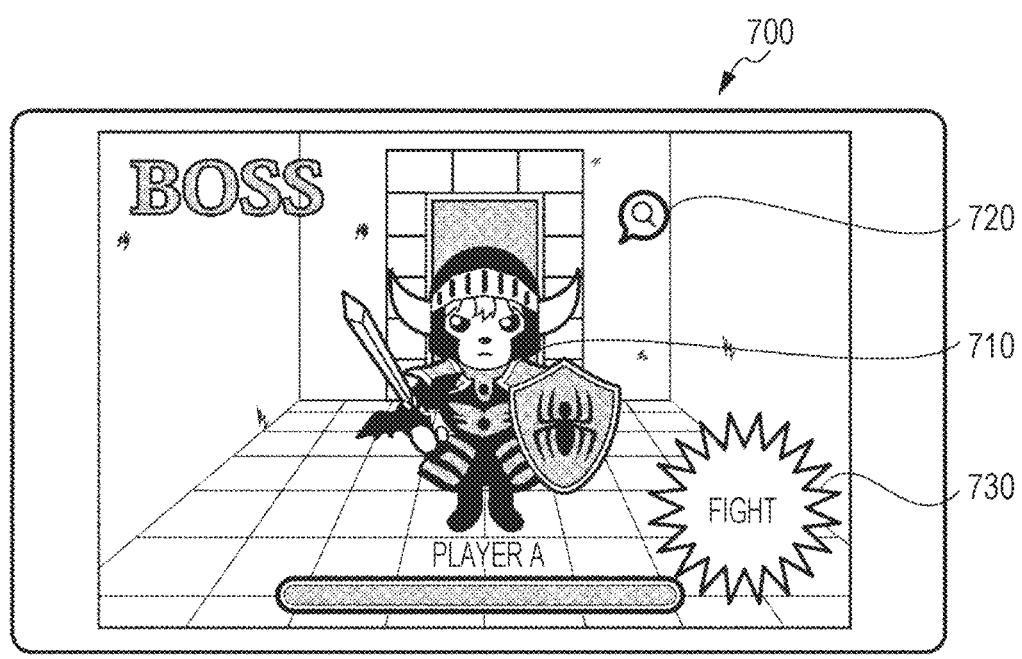
FIG. 6 illustrates an example game screen (boss battle) according to the first embodiment of the present invention.

FIG. 6 illustrates an example game screen displayed on the display unit 120 of the mobile terminal of another player (e.g., the "player B") who attempts to conquer the player A's tower. When the player B attempts to conquer the player A's tower, the status of the player A's progress through the game in the player A's tower (including the above-described information concerning the player character A of the player A), which was received by the server 200 from the mobile terminal 100A of the player A, may be transmitted to the mobile terminal 100B of the player B. As indicated on a game screen 700, a boss enemy on the top floor of the player A's tower may be the player character A of the player A, which is a player character 710. The player character 710 is displayed in such a manner that the player character 710 is wearing pieces of equipment that are set by the player A. That is, the player character 710 has attack ability and protective ability which are determined by the pieces of equipment or items that the player character 710 is wearing. Tapping on an enlargement button 720 allows the player B to display the attack ability of the player character A, the details of the pieces of equipment, and any other information. Tapping on a "fight" button 730 allows the player B to fight against the player character A.

Figure 7:
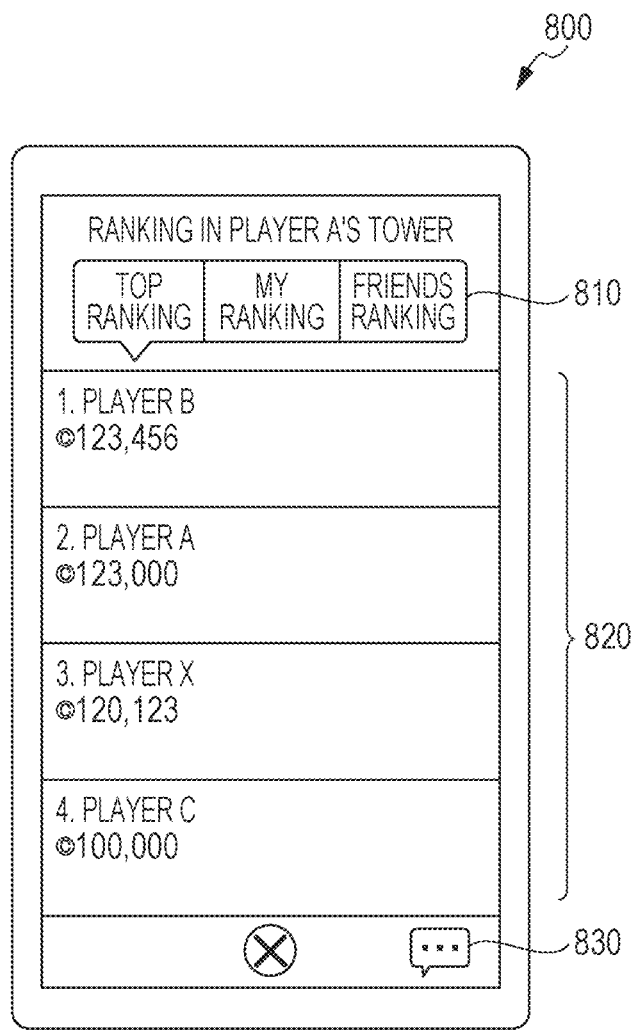
FIG. 7 illustrates an example game screen (ranking view) according to the first embodiment of the present invention.

FIG. 7 illustrates an example of the ranking of a plurality of players of the game in the player A's tower. The ranking may be determined by the comparison unit 253 of the server 200 comparing the status of the individual players who progress through the game in the player A's tower. For example, according to one exemplary embodiment, the ranking on the display unit 120 of the mobile terminal 100A of the player A is displayed. Prior to the display of the ranking, the mobile terminal 100A of the player A may receive information concerning the ranking determined by the comparison unit 253 of the server 200. As illustrated in FIG. 7, a ranking view 800 shows a tab menu 810, a ranking list 820, and a social sharing button 830. The tab menu 810 may include "Top ranking", "My ranking", and "Friends ranking" tabs, or other tabs, and the player can select a type of ranking that they wishes to display. In the illustrated example, "Top ranking" is selected, and top-ranked players in the player A's tower are displayed. In the illustrated example, the ranking is determined based on the total number of coins acquired in the player A's tower. As illustrated in FIG. 7, it is found that the "player B" is ranked first and the number of coins acquired in the player A's tower is "123,456". It is further found that the "player A" is ranked second and the number of coins acquired in the player A's tower is "123,000". A ranking view may be generated by the display processing unit 152 based on information concerning the view (top-ranked players and the number of coins acquired by the players) which is received by the mobile terminal 100A. Alternatively, a ranking view may be generated by the display processing unit 252 of the server 200, and display information may be transmitted to the mobile terminal 100A.

When "My ranking" is selected on the tab menu 810, players including the player A in the ranking are displayed. When "Friends ranking" is selected, the ranking of each player having a friendship with the player A is displayed. Here, the term "friend" refers to another player with whom the player A has performed a process of associating the player A. Examples of the friend include another player who controls another player character to which the player A has expressed their greeting such as sending a message among other player characters that the player A has encountered while exploring the common tower 611. Other examples of the friend may include another player having a friendship with the player A on an SNS. The social sharing button 830 is used to share the ranking illustrated in FIG. 7 on an SNS.

As described above with reference to the start screen 500 illustrated in FIG. 4, according to an exemplary embodiment, the news button 550 may also be displayed on the above-described display screen for the common tower, the battle tower, and other players' towers. The news button 550 on the display screen for the player A's tower may be labeled with a ranking view, and tapping on the labeled ranking view may allow a player to display the ranking view 800 illustrated in FIG. 7.

As described above, according to an exemplary embodiment, a plurality of players are ranked according to the battle record in a player's tower. This ranking may be accessible to players other than the player. This can give top-ranked players a sense of achievement and give players of lower ranking encouragement to tackle the game multiple times. In addition, interaction among a plurality of players can be stimulated.

Furthermore, according to an exemplary embodiment, interaction may be enabled among a plurality of players that is centered on a player's tower, that is, a player. Specifically, in addition to enabling a player to interact with other players in the player's game area, such an exemplary embodiment enables other players to interact with one another (that is, compete with one another in the ranking, exchange messages with other players while battling in the tower, etc.) in the player's game area. In addition, since players' game areas have different configurations from player to player, other players who get together in a certain player's game area feel that the configuration is attractive and are closely related to each other accordingly. Accordingly, other players with similar preferences get together in a certain player's game area, and can actively interact with one another. Consequently, diverse opportunities of interaction are created for the individual players' areas in the game space, resulting in the stimulation of interaction among players.

Additionally, a reward specific to a player's tower may be provided to other players in the top ranking in the player's tower. For example, while any other player ranked in top 100 for the player A's tower is exploring the player A's tower, an item that is difficult to acquire in any other player's tower but can be acquired in the player A's tower may be made to appear. In addition, a specific enemy character may appear which does not appear in any other player's tower but appears in the player A's tower and which allows a player to acquire a double reward such as the number of coins or the experience value when the player defeats the enemy character. That is, the reward providing unit 255 of the server 200 determines other players who can gain a reward specific to the player A's tower on the basis of the ranking in the player A's tower. A player who wins a boss battle in the player A's tower can acquire (take out) an item.

In this way, a player who is top-ranked in any other player's tower can acquire a reward (such as an item or coin) specific to the other player's tower. This can further motivate a player to repeatedly play the game in any other player's tower.

The above-described reward provided to top-ranked players may be at least partially different for each of other players' towers. That is, the reward providing unit 255 may change the type of specific reward for each player's tower. For example, items which can be acquired in the player A's tower may be different from items which can be acquired in the player B's tower. Accordingly, each player can be motivated to visit a plurality of other players' towers in order to achieve the top ranking position in the plurality of other players' towers, leading to active interaction among a plurality of players. In addition, since only players in the top ranking may be able to acquire a specific item, acquisition of such a specific item can make a player feel achievement because others do not possess the item.

Furthermore, the reward provided to other players who have explored the player A's tower may be changed in accordance with the battle record of the player A in the common tower or the battle tower. For example, according to an exemplary embodiment, when the player A successfully conquers the top floor of the battle tower, the player A's tower may become special to other players for a certain period, so that a player who visits the player A's tower during this period is provided with a special reward different from a normal reward that can be gained during other periods. Examples of providing the player with the special reward may include making an item that does not appear within a period during which the player A's tower is not special appear while the player is battling in the tower, or may include enabling the player to acquire double or more coins compared to normal when the player wins a fight. That is, the reward providing unit 255 determines when or if a player's tower can become a special tower, on the basis of the status of individual players who progress through the game; such information may be stored in the status storage unit 262. While the player A's tower is a special tower, the appearance of the player A's tower displayed to other players may be changed in such a manner that, for example, the player A's tower is illuminated. This is achievable by transmitting information concerning the appearance of a player's tower that becomes a special tower from the server 200 to the respective mobile terminals of the other players. In addition, the player A can share a situation in which the player A's tower has become a special tower on an SNS to brag to other players.

In this way, each player is able to make the player's tower attractive to other players in accordance with their progress in the game. This allows the player to plunge enthusiastically into the game. In addition, each player is able to make the player's tower appeal to other players, providing increased motivation for the player. Additionally, the other players can be given an incentive to visit the player's tower, resulting in the growth of interaction among players.

Furthermore, each player may be provided with a reward according to the status of visitors of the player's tower. For example, each player may be provided with a reward in accordance with the number of other players who have visited the player's tower, the number of times other players have failed to conquer the player's tower, or the like. According to an exemplary embodiment, this may be achieved by the reward providing unit 255 determining a reward to be provided in the player's tower on the basis of the status of the individual players who progress through the game (including which player has visited which player's tower, and the number of times other players have failed to conquer the player's tower) which is stored in the status storage unit 262. This configuration enables each player to make the player's tower more attractive or make the player's tower more difficult to conquer, and can motivate each player to actively interact with other players.

Figure 8:
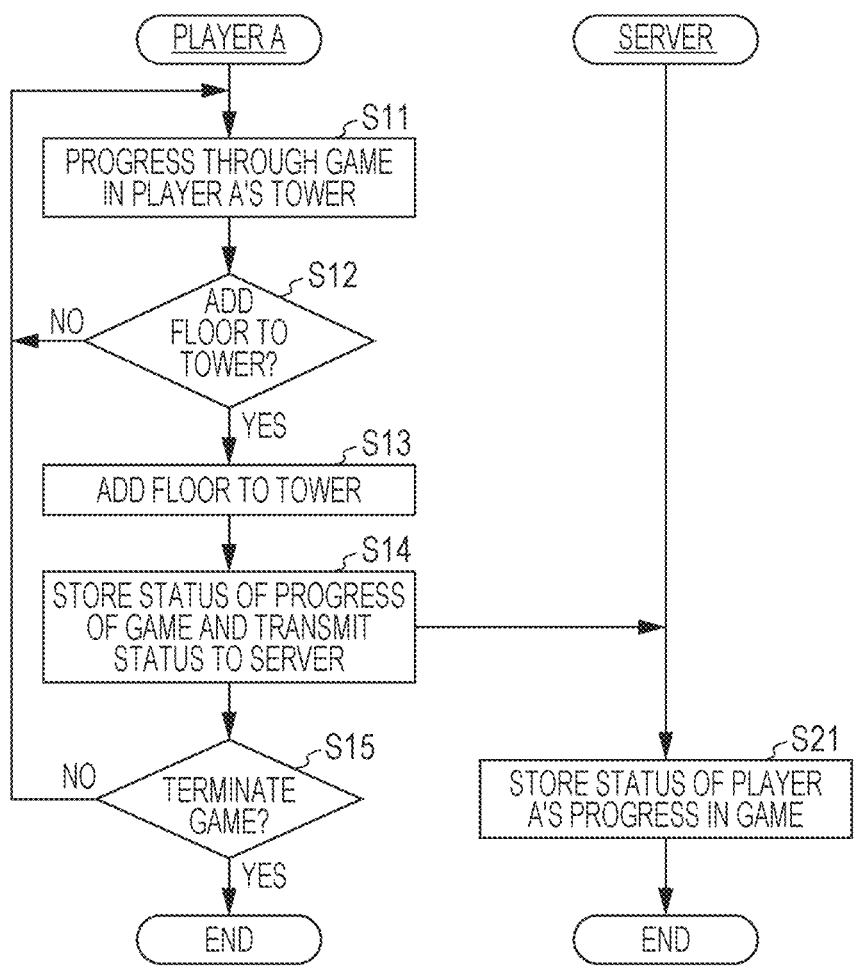
FIG. 8 is a flowchart illustrating a process for a game in a player's tower.

Turning now to FIG. 8, an exemplary embodiment of a control method may be described using a flowchart. FIG. 8 is a flowchart illustrating an example of a process for allowing the player A to play a game in a player's tower by using the mobile terminal 100A.

As illustrated in FIG. 8, the progress unit 153 of the mobile terminal 100A may cause a game to progress in the player A's tower in accordance with operation input information from the player A through the input acceptance unit 130 (step S11). When the player A successfully conquers the top floor of the player A's tower, the display processing unit 152 may display a button for adding a new floor to the tower on the display unit 120, which may be tapped by the player. The information processing unit 151 determines whether or not the player A has tapped on the button for adding a new floor to the tower on the input acceptance unit (touch panel) 130 (step S12). If the information processing unit 151 determines that the player A has tapped on the button for adding a new floor to the tower and the player A owns coins necessary to add a new floor to the tower (which may be determined by the progress unit 153), the update unit 155 may add a new floor to the tower, or may otherwise update the tower (step S13). Then, information concerning the status of the progress of the game in the player A's tower (such as the number of floors of the player's tower, the number of coins, or items acquired) may be stored in the status storage unit 162 (step S14). The information processing unit 151 determines whether or not an instruction is given by the player A to terminate the game (step S15). If an instruction is given to terminate the game, the progress unit 153 terminates the game. If no instruction is given to terminate the game or if no floor is added to the tower in step S12, the process returns to step S11. Then, the progress unit 153 causes the game to progress in the player A's tower.

The information concerning the status of the progress of the game in the player A's tower may be transmitted from the communication unit 110 to the server 200. The information concerning the status of the player A's progress in the game, which is transmitted to the server 200, may be stored in the status storage unit 262 of the server 200 in association with the player A (step S21).

According to an exemplary embodiment, information concerning the status of the progress of the game, may be stored in the status storage unit 162; this may be displayed in FIG. 9. FIG. 9 illustrates an example of a table illustrating the information concerning the status of the player A's progress in the game in the player A's tower, which is stored in the status storage unit 162. As illustrated in FIG. 9, an exemplary embodiment of a table 910 may include a "player name", "the number of floors of the tower", "the number of coins", an "item (weapon)", an "accessory", "decoration", and an "achievement list". In the illustrated example, the player A's tower is currently a "12-story tower", and the player A currently owns "123,000" coins. Further, types of items and accessories that the player character A is wearing and types of items and accessories that the player character A is not wearing but owns are stored. It is also found that the player A's tower is decorated with images such as "001.jpg". Furthermore, it is found that the player A has achieved "achievement list 01".

The process described with reference to FIG. 8 may also apply to the case where a plurality of players of the game (e.g., the players B and C) play the game in a player's tower. According to such an exemplary embodiment, the status storage unit 262 of the server 200 may store, for each of the plurality of players, information concerning the status of the progress of the game. FIG. 10 illustrates an example of a table illustrating the status of individual players who progress through the game in the towers associated with the corresponding players, which is stored in the status storage unit 262 of the server 200. As illustrated in FIG. 10, a table 920 may store information on the towers associated with the individual players (information concerning the stages of the towers associated with the individual players) and information concerning player characters controlled by the individual players.

Figure 11:
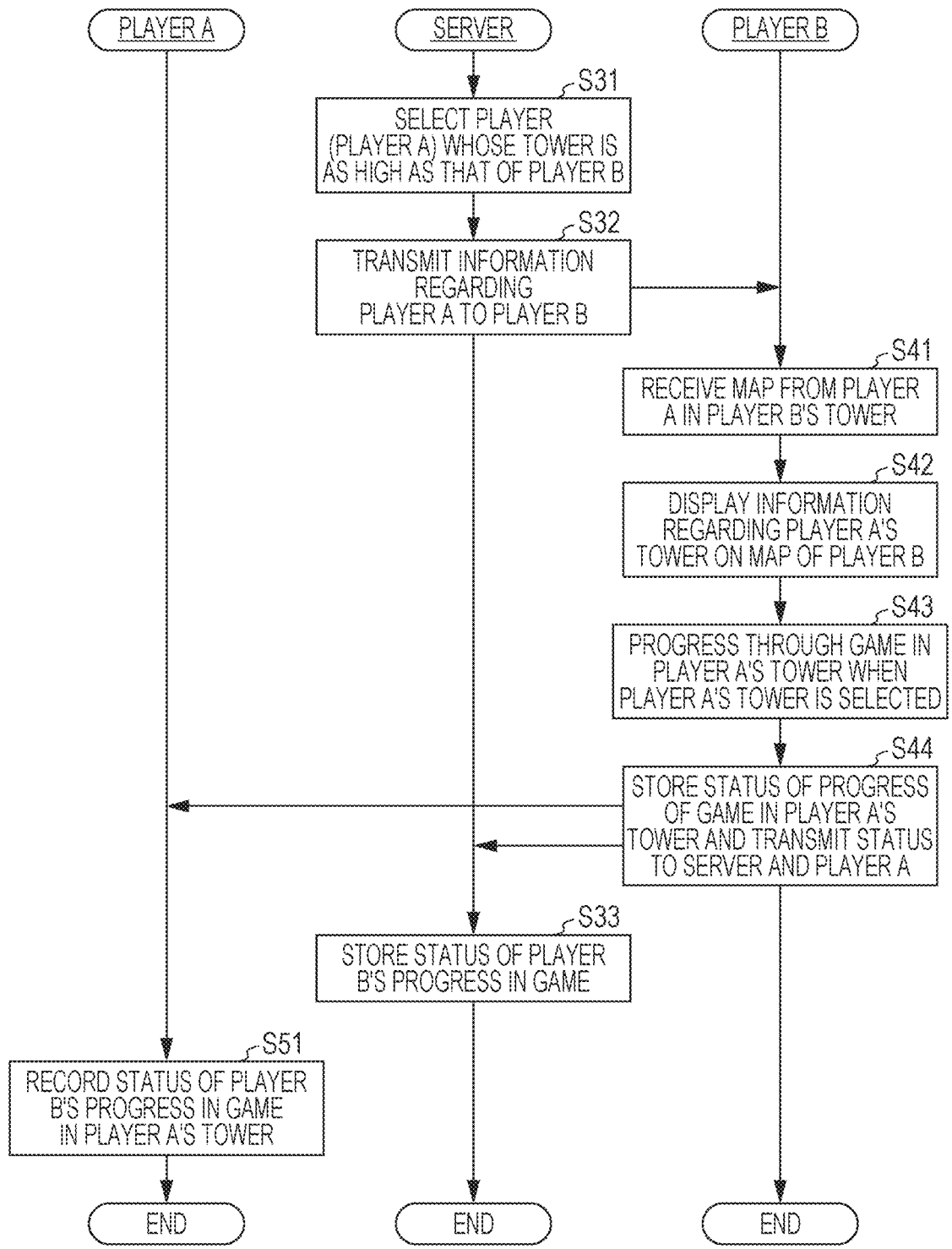
FIG. 11 is a flowchart illustrating an example of a process for allowing a player B to explore the player A's tower.

Turning now to FIG. 11, a process for allowing the player B to explore the player A's tower may be described. FIG. 11 is a flowchart illustrating an exemplary embodiment of a process for allowing the player B to explore the player A's tower. In the following, each component of the mobile terminal 100B of the player B is identified by the corresponding reference numeral accompanied by letter "B". The functions of the individual components of the mobile terminal 100B are similar to those of the mobile terminal 100A described above.

According to an exemplary embodiment, the comparison unit 253 of the server 200 may first reference the information in the table 920 stored in the status storage unit 262, and may compare the height of the player B's tower with the height of each player's tower if the height of the player B's tower satisfies a predetermined condition (e.g., four or more floors). Then, the comparison unit 253 may select the player A whose tower has a number of floors equal to the number of floors of the player B's tower, namely, "12" (step S31). The information processing unit 251 may transmit the information concerning the player A, which is stored in the table 920, to the mobile terminal 100B of the player B via the communication unit 210 (step S32). The information to be transmitted to the player B may not necessarily include an achievement list, items and accessories that the player character is not wearing but owns, or the number of coins owned.

The communication unit 110B of the mobile terminal 100B receives the information concerning the player A transmitted from the server 200, and stores the received information in the status storage unit 162B. Then, the progress unit 153B causes the player character A of the player A to be displayed in the player's tower (the player B's tower) during the progress of the player B through the game in the player's tower (the player B's tower), and the player B receives a map from the player character A (step S41). When the player B escapes from the player's tower carrying acquired items with them, the map generation unit 157B may display information regarding the player A's tower on the map (map B) of the player B (step S42). When the player B selects the player A's tower on the map B, the progress unit 153B may cause the player B to progress through the game in the player A's tower (step S43). At this time, the player A's tower is displayed on the display unit 120B on the basis of the information concerning the player A, which is stored in the status storage unit 162B. For example, referring to the table 920, the player A's tower is a 12-story tower, and the boss enemy (the player character A) on the top floor is equipped with ITM001, ITM005, and ITM010. In addition, the player A's tower is decorated with images in 001.jpg and 002.jpg.

In the flowchart illustrated in FIG. 11, in step S32, the mobile terminal 100B of the player B collectively receives all the pieces of information concerning the player A, by way of example. Alternatively, the mobile terminal 100B may divide and receive the pieces of information concerning the player A in step S41 to S43. For example, the mobile terminal 100B can receive information concerning the player character controlled by the player A before step S41, receive information concerning the player A's tower before step S42, and obtain information on the inside of the player A's tower before step S43. In addition, in step S43, the mobile terminal 100B may obtain information on the player A's tower in accordance with the progress of the game in the player A's tower, for example, each time the player B conquers three floors of the player A's tower (that is, each time the player B conquers the third floor, the sixth floor, the ninth floor, etc.).

Then, information concerning the status of the player B's progress through the game in the player A's tower may be stored in the status storage unit 162B in association with the player A's tower, for example, when the player B terminates the game or when the player B escapes from the player A's tower. The stored information is transmitted from the communication unit 110B to the player A (the mobile terminal 100A) and the server 200 (step S44). The server 200 stores the information received from the mobile terminal 100B of the player B in the status storage unit 262 (step S33). The information on the player B includes the status of the player B's progress through the game in the player A's tower. The mobile terminal 100A of the player A stores the status of the player B's progress through the game in the player A's tower, which is received from the mobile terminal 100B of the player B, in the status storage unit 162 (step S51). Methods by which mobile terminals directly perform wireless communication include an ad hoc mode in which the mobile terminals 100A to 100C transmit and receive game information directly to and from one another by using their respective adapters (not illustrated) for wireless communication, and an infrastructure mode in which the mobile terminals 100A to 100C transmit and receive game information indirectly to and from one another via access points (not illustrated).

In the flowchart illustrated in FIG. 11, according to an exemplary embodiment, in step S44, information concerning the status of the player B's progress through the game may be transmitted from the player B (the mobile terminal 100B) directly to the server 200 and the player A (the mobile terminal 100A). Alternatively, the status of the player B's progress through the game may be transmitted to the player A (the mobile terminal 100A) from the server 200. That is, information concerning the status of the player B's progress through the game may be transmitted from the mobile terminal 100B to the server 200, and then transmitted from the server 200 to the mobile terminal 100A.

According to an exemplary embodiment, a player C may be able to explore a player A's tower in response to player A exploring player C's tower. A process for allowing the player C to explore the player A's tower as a result of the player A having explored the player C's tower and information concerning the player A being displayed on the player C's tower may be described using a flowchart. In the following, each component of the mobile terminal 100C of the player C is identified by the corresponding reference numeral accompanied by letter "C". The functions of the individual components of the mobile terminal 100C are similar to those of the mobile terminal 100A described above.

Figure 12A:
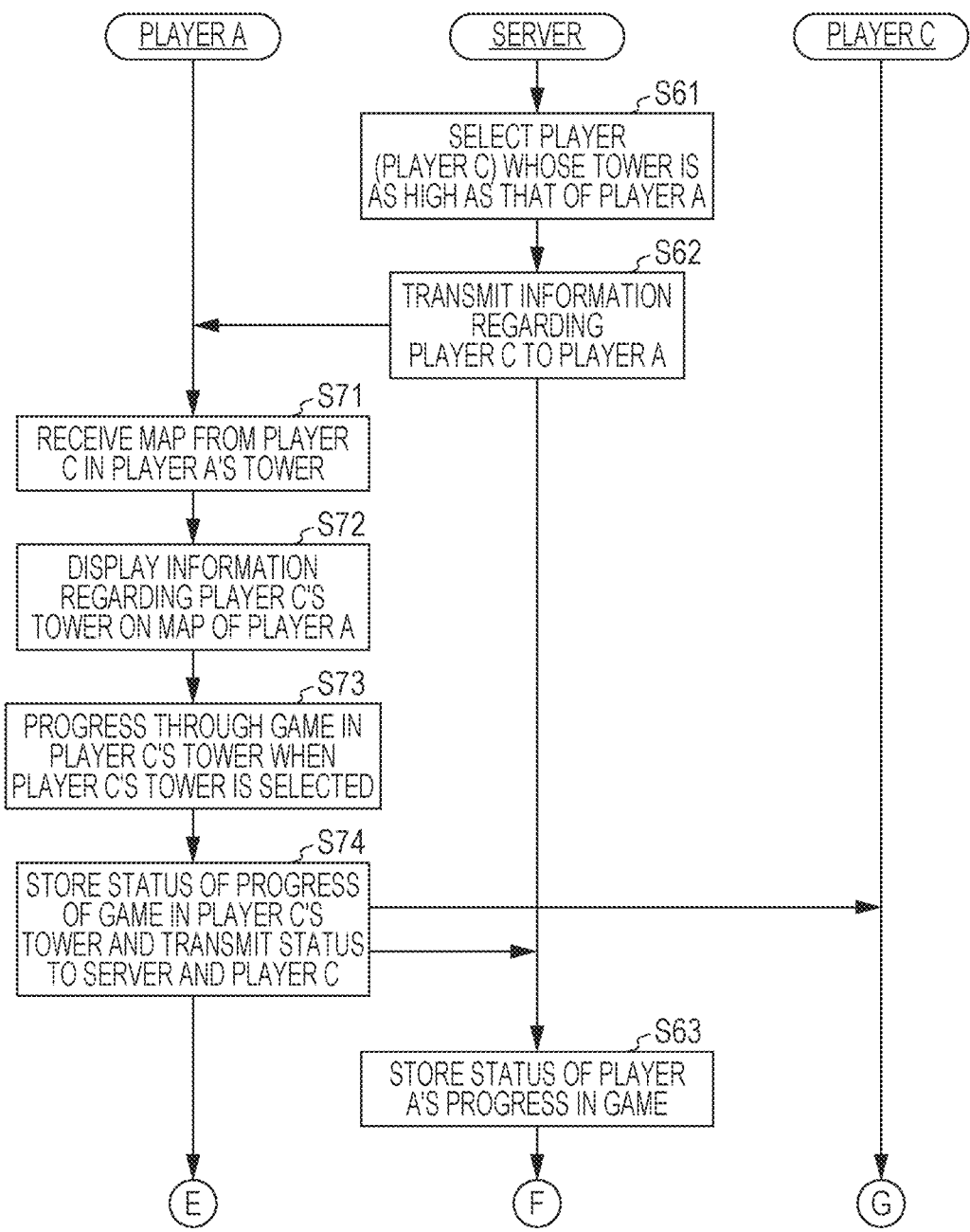
FIG. 12A is a flowchart illustrating an example of a process for allowing a player C to explore the player A's tower.
Figure 12B:
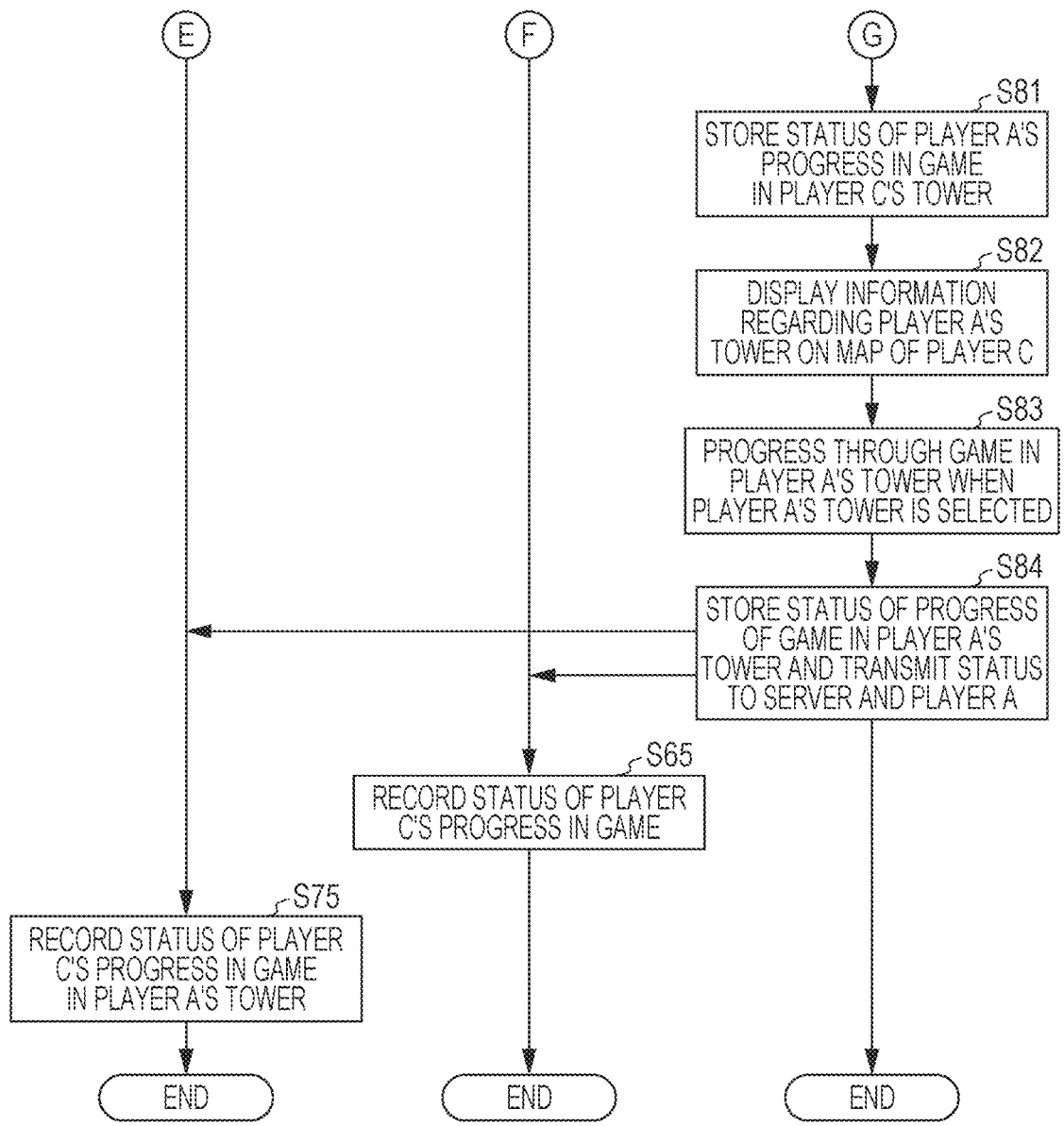
FIG. 12B is a flowchart illustrating an example of the process for allowing the player C to explore the player A's tower.

FIGS. 12A and 12B, taken together, depict a flowchart illustrating an example of the process described above. The flowcharts depicted in FIGS. 12A and 12B may be linked, such that the reference locations "E," "F," and "G" depicted in FIG. 12A correspond to identically-labeled reference locations in FIG. 12B. Turning now to FIG. 12A, first, the comparison unit 253 of the server 200 may refer to the information in the table 920 stored in the status storage unit 262, and may compare the height of the player A's tower with the height of each player's tower if the height of the player A's tower satisfies a predetermined condition (e.g., four or more floors). Then, the comparison unit 253 selects the player C whose tower has a number of floors equal to the number of floors of the player A's tower, namely, "12" (step S61). The information processing unit 251 transmits the information concerning the player C stored in the table 920 to the mobile terminal 100A of the player A via the transmitting unit 212 (step S62). The information to be transmitted to the player A may include an achievement list, items and accessories that the player character is not wearing but owns, or the number of coins owned; alternatively, such information may not be transmitted.

The communication unit 110 of the mobile terminal 100A may receive the information concerning the player C transmitted from the server 200, and may store the received information in the status storage unit 162. Then, the progress unit 153 causes the player character C of the player C to be displayed in the player's tower (in this case, the player A's tower) during the progress of the player A through the game in the player's tower (the player A's tower), and the player A receives a map from the player character C (step S71). When the player A escapes from the player's tower carrying acquired items with them, the map generation unit 157 displays information regarding the player C's tower on the map (map A) of the player A (step S72). When the player A selects the player C's tower on the map A, the progress unit 153 may cause the player A to progress through the game in the player C's tower (step S73). At this time, the player C's tower is displayed on the display unit 120 on the basis of the information concerning the player C stored in the status storage unit 162. For example, referring to the table 920, the player C's tower is a 12-story tower, and the boss enemy (the player character C) on the top floor is equipped with ITM001, ITM004, and ITM020. In addition, the player C's tower is decorated with an image in 032.jpg.

Then, information concerning the status of the player A's progress through the game in the player C's tower may be stored in the status storage unit 162 in association with the player C's tower. Storage may be updated, for example, when the player A terminates the game or when the player A escapes from the player C's tower. The stored information may be transmitted from the communication unit 110 (the transmitting unit 112) to the server 200 and the mobile terminal 100C of the player C (step S74).

The server 200 may store the information received from the mobile terminal 100A of the player A in the status storage unit 262 (step S63). The information on the player A includes the status of the player A's progress through the game in the player C's tower. The mobile terminal 100C of the player C may store the status of the player A's progress through the game in the player C's tower, which is received from the mobile terminal 100A of the player A, in the status storage unit 162C (step S81). In the flowchart illustrated in FIGS. 12A and 12B, in step S74, the status of the player A's progress through the game may be transmitted from the player A (the mobile terminal 100A) directly to the player C (the mobile terminal 100C). Alternatively, the information concerning the status of the player A's progress through the game may be transmitted from the player A (the mobile terminal 100A) to the server 200, and then transmitted from the server 200 to the player C (the mobile terminal 100C).

The map generation unit 157C may display information regarding the player A's tower on the map (map C) of the player C (step S82). When the player C selects the player A's tower on the map C, the progress unit 153C may cause the player C to progress through the game in the player A's tower (step S83). At this time, the player A's tower is displayed on the display unit 120C on the basis of the information concerning the player A, which is stored in the status storage unit 162C. For example, referring to the table 920, the player A's tower may be a 12-story tower, and the boss enemy (the player character A) on the top floor is equipped with ITM001, ITM005, and ITM010. In addition, the player A's tower is decorated with images in 001.jpg and 002.jpg.

Then, information concerning the status of the player C's progress through the game in the player A's tower may be stored in the status storage unit 162C in association with the player A's tower, for example, when the player C terminates the game or when the player C escapes from the player A's tower. The stored information may be transmitted from the communication unit 110C to the server 200 and the mobile terminal 100A of the player A (step S84).

The server 200 stores the information received from the mobile terminal 100C of the player C in the status storage unit 262 (step S65). The mobile terminal 100A of the player A stores the status of the player C's progress through the game in the player A's tower, which is received from the mobile terminal 100C, in the status storage unit 162 (step S75). Here, similarly to the case described above, the status of the player C's progress through the game may not be transmitted from the player C to the player A in step S84 but may be transmitted from the player C via the server 200.

Turning now to FIG. 13, information for the map A of the player A may be used to generate a map for any other player's tower. FIG. 13 is a table illustrating an example of information concerning other players' towers, which is used to generate the map A. As illustrated in FIG. 13, a table 930 at least includes information concerning the player B's tower, the player C's tower, and a player J's tower. For example, information concerning the player B's tower is stored in step S51 in the flowchart illustrated in FIG. 11, and information concerning the player C's tower is stored in step S75 in the flowchart illustrated in FIG. 12B. Additionally, information on the player J may be received from the server 200, for example, when the player A checks information on the player J's tower (when the player J's tower is activated from the URL schema of the player J), which is made publicly available on an SNS by the player J, for example. The information in the table 930 is updated when each player changes information on the player, such as the height of the player's tower or the item with which the player character of the player is equipped. This may allow the player A to visit any other player's tower of the latest version. The information in the table 930 may be stored in the server 200, and a map may be generated by the map generation unit 254 of the server 200. Then, the server 200 may transmit display information for displaying the generated map to the mobile terminal 100A from the transmitting unit 212.

FIG. 14 illustrates an example of a table illustrating information concerning any other player's tower that each player has visited. According to an exemplary embodiment, such tables may be stored in the status storage unit 262 of the server 200. As illustrated in FIG. 14, a table 940 may store items for each player, such as a "visited tower", "the number of floors reached", "the number of coins acquired", "the number of visits", and "acquired item (weapon)". In the example illustrated in FIG. 14, the player A has visited the tower of the "player B", and the number of floors reached is "6". Further, the player A has visited the player B's tower "four times", and has acquired "ITM349".

Information based on the table 940 illustrated in FIG. 14, which indicates the status of each player who progresses through the game in the player A's tower, will be described. FIG. 15 illustrates an example of a table that table that stores the status of individual players who progress through the game in the player A's tower. As illustrated in FIG. 15, a table 950 may store items such as a "player name" indicating the name of a player who has visited the player A's tower, "the number of floors reached", "the number of coins acquired", and "the number of visits". The table 950 may be stored in the status storage unit 262 of the server 200.

Figure 16:
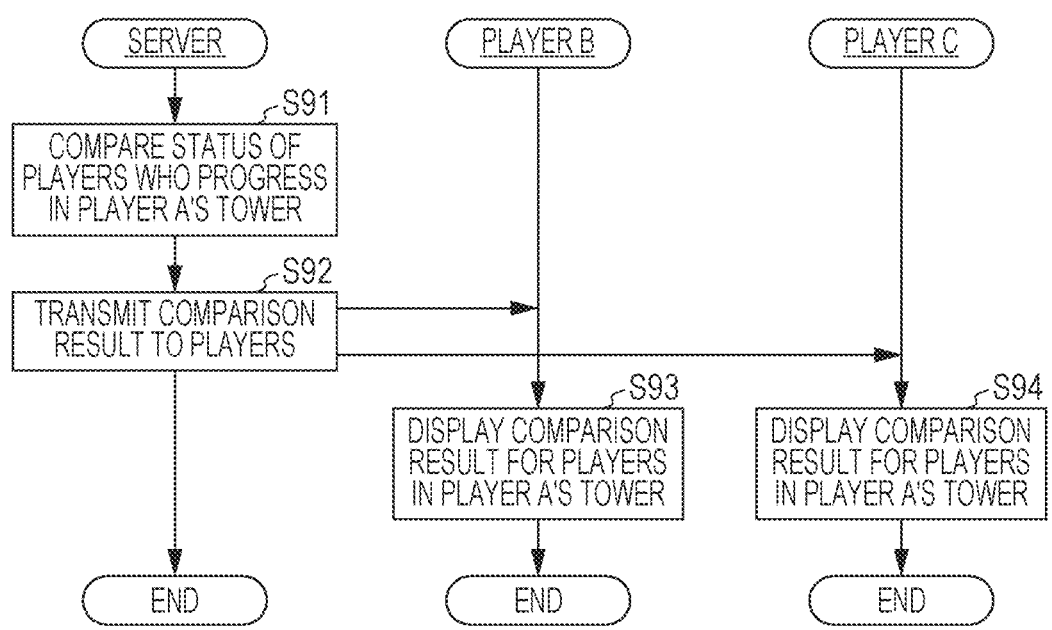
FIG. 16 is a flowchart illustrating an example of a process for determining ranking.

Turning now to FIG. 16, a process for determining ranking in the player A's tower based on the table 950 may be described. FIG. 16 is a flowchart illustrating an exemplary embodiment of a process for determining ranking. Prior to the description of the process, it is assumed that the table 950 has been stored in the status storage unit 262 of the server 200, though other configurations are possible.

According to an exemplary embodiment, first, the comparison unit 253 of the server 200 compares the status of individual players who progress through the game in the player A's tower based on the table 950 (step S91). The server 200 transmits a received comparison result to the individual players (in the illustrated example, the players B and C) via the communication unit 210 (step S92). Then, the comparison result is displayed on the display units 120B and 120C of the mobile terminals 100B and 100C of the players B and C (steps S93 and S94). The ranking may be based on, for example, the number of coins as illustrated in FIG. 7, or may be based on the number of visits. Alternatively, the ranking may be based on the number of floors reached. The comparison result may be transmitted to the mobile terminal 100A of the player A, and displayed on the display unit 120 of the mobile terminal 100A.

While the configuration in which the server 200 determines ranking has been described with reference to FIG. 16, the ranking in the player A's tower may be determined by a mobile terminal such as the mobile terminal 100A of the player A. For example, in a case where the ranking is determined by the mobile terminal 100A of the player A, the information in the table 950 may be transmitted from the server 200 to the mobile terminal 100A via the network 300, and is stored in the status storage unit 162. Then, the comparison unit 156 of the mobile terminal 100A may compare the status of individual players who progress through the game in the player A's tower based on the table 950. The comparison result may be transmitted to the server 200 via the communication unit 110, and the server 200 may transmit the comparison result to the mobile terminals 100B and 100C. The comparison result may be transmitted from the mobile terminal 100A directly to the mobile terminals 100B and 100C by using the ad hoc mode or infrastructure mode described above without the intervention of the server 200.

Advantages achievable by some exemplary embodiments will be described again. As described above, according to an exemplary embodiment, when a player visits any other player's tower and explores and conquers the other player's tower, the number of floors of the other player's tower may have been increased the next time the player logs in. An enemy character that the player encounters and the item that the player can acquire change depending on the height of the tower, which can give the player an incentive to visit and conquer the other player's tower multiple times. This can result in the growth of interaction among players. In addition, a plurality of players may be ranked according to the battle record in a player's tower and the ranking may also be accessible to players other than the player. This can give top-ranked players a sense of achievement and give players of lower ranking encouragement to tackle the game multiple times. Furthermore, every player can be encouraged to be competitive, and interaction among a plurality of players can be stimulated.

According to an embodiment of the present invention, furthermore, a player who is top-ranked in any other player's tower can acquire a specific reward (such as an item or coin). This can further motivate a player to repeatedly play the game in any other player's tower.

According to an exemplary embodiment, the above-described reward provided to top-ranked players may be at least partially different for each of other players' towers. Accordingly, each player can be motivated to visit a plurality of other players' towers in order to achieve the top ranking position in the plurality of other players' towers, leading to active interaction among a plurality of players. In addition, since only players in the top ranking may be able to acquire a specific item, acquirement of such a specific item can make a player feel achievement because others do not possess the item.

Furthermore, according to an exemplary embodiment, the reward provided to other players who have explored a player's tower may be changed in accordance with the battle record of the player in the common tower or the battle tower. In this way, each player is able to make the player's tower attractive to other players in accordance with their progress in the game. This allows the player to plunge enthusiastically into the game. In addition, each player is able to brag to other players about the player's tower, providing increased motivation for the player. Additionally, the other players can be given an incentive to visit the player's tower, resulting in the growth of interaction among players.

According to an embodiment of the present invention, furthermore, a player can be encouraged to conquer any other player's tower. Here, a level of any other player's tower having a height equivalent to that of a given player's tower, such as the characteristic values of an enemy character that appears, may be considered to be an equivalent of the given player's tower. This may cause the towers that a player has available to conquer to scale in level with the player's own advancement, which may cause the difficulty of the conquest of the other player's tower to be maintained at the right level (that is, a level which is not too difficult or too easy). This may allow for the given player to enjoy the game, and can maintain the motivation of the given player to play the game.

In addition, according to an embodiment of the present invention, other players who can play a game in a given player's tower may be other players associated with the given player on any other service (such as an SNS or any other game), that is, another player having a friendship with the given player. In this way, a player's friend on an SNS or in any other game is allowed to explore the player's tower, which can provide an attractive incentive for the player and the friend to enjoy the game together.

According to an exemplary embodiment a player may be provided with information on another player who has visited the player's tower, which can motivate the player to visit the other player's tower. This can result in the growth of interaction among players.

According to an exemplary embodiment, furthermore, a map for other players' towers that a player can visit may be generated and displayed to the player. This allows the player to understand other players' towers that the player can visit at a glance. In addition, tapping on a point on the map allows the player to readily visit any other player's tower corresponding to the point, which can motivate the player to visit other players' towers and facilitate the promotion of interaction among players.

According to an exemplary embodiment, furthermore, a player can decorate the player's tower with a decorative element. The decorated tower is also displayed to other players in the same fashion. Accordingly, a player can decorate the player's tower at their own preference to make the player's tower appeal to other players, thereby providing the player with a more entertaining experience.

According to an exemplary embodiment, a plurality of players may be ranked according to the battle record in a player's tower and the ranking may also be accessible to players other than the player. This can give top-ranked players a sense of achievement and give players of lower ranking encouragement to tackle the game multiple times. In addition, interaction among a plurality of players can be stimulated.

While exemplary embodiments of the present invention have been described, it is to be understood that the present invention is not limited to said embodiments. For example, in one alternative exemplary embodiment, a player may visit any other player's tower in such a manner that any other player who has visited the player's tower can visit any other player's tower listed on the ranking in the player's tower (a configuration for navigating from the ranking in the player's tower may be used). This may be achievable by, for example, when transmitting information concerning the player A's tower from the server 200 to a mobile terminal of another player (the player B), also transmitting information concerning other players (such as the players C and D) listed on the ranking in the player A's tower (including information on the heights of the other players' towers and the equipment of player characters controlled by the other players). Alternatively, the following procedure may be used. The server 200 may transmit display information for displaying the ranking in the player A's tower to the mobile terminal 100B of the player B to display the ranking on the mobile terminal 100B (the display unit 120B) of the player B. Then, the player B may tap on and selects another player (such as the player C or D) displayed on the display unit 120B (the input acceptance unit 130B accepts operation information), and may transmit a request to the server 200 to transmit information concerning the selected other player. Then, the server 200 may transmit the information concerning the other player selected by the player B. In this configuration, ranking a player in any other player's tower with a large number of visitors can allow a larger number of other players to visit the player's tower. Accordingly, a player can be motivated to tackle the game to boost their ranking in a player's tower with a large number of visitors.

According to another exemplary embodiment, still another configuration may be used in which, for example, when interacting with the player B (such as when visiting and conquering the player B's tower), the player A may be able to interact with the player C who has a relationship with the player B (such as being able to visit the player C's tower). The term "the player C having a relationship with the player B", as used here, is used to indicate that the player B has conquered the player C's tower or that the player B and the player C have a friendship with each other on an SNS or in any other game. This configuration is achievable using the following procedure. For example, when the player A progresses through the game in the player B's tower, information concerning the presence of the player C (information indicating that the player C interacts with the player B) may be transmitted from the server 200, and the display processing unit 152 may display news which indicates that the player A is also able to visit the player C's tower that the player B has conquered, in response to tapping on the news button 550 on the start screen 500 of the game illustrated in FIG. 4. Then, the map generation unit 157 may cause the player C's tower to be displayed in the list 630 on the map 600 illustrated in FIG. 5. When the input acceptance unit 130 accepts the operation of the player A tapping on the player C's tower, the control unit 150 may request information concerning the player C's tower from the server 200, and may receive information concerning the player C's tower from the receiving unit 111.

In the foregoing description, furthermore, other players' towers are displayed as a list on a map. However, according to an alternative exemplary embodiment, other players' towers may be displayed on a map in a manner similar to that of the common tower. Furthermore, other players' tower may be displayed on a map in such a manner that the display positions thereof on the map can be changed in accordance with the relationship with a player. For example, any other player's tower having a closer relationship with a player may be displayed so as to be closer to the player's tower. The term "any other player's tower having a close relationship with a player", as used here, refers to a tower associated with any other player who has visited the player's tower a larger number of times, or any other player's tower that the player has visited a large number of times. In addition, other players' towers may be displayed on a map in such a manner that the display positions thereof on the map can be changed in accordance with the relationship among other players. For example, a tower associated with any other player A may be displayed so as to be closer to a tower associated with any other player B which has a close relationship with the other player A (for example, a relationship based on the other player A having visited the player B's tower multiple times). In this case, for example, the comparison unit 253 of the server 200 may compare relationships between players, which are stored in the status storage unit 262, and the map generation unit 254 may generate map information for displaying other players' towers while changing the spaces in which the other players' towers are displayed in accordance with the relationships. A condition of the display spaces may be stored in advance in the storage unit 260. The generated map information may be transmitted to the mobile terminal 100, and may be controlled by the display processing unit 152 so as to be displayed on the display unit 120 of the mobile terminal 100.

The configuration described above allows a player to check their relationships with other players at a glance, which can give an indication of interaction with other players.

Additionally, in accordance with the above-described distance between a player's tower and any other player's tower, information related to the other player's tower, such as parameters, may be changed. For example, the number of coins or the like required for a player to visit any other player's tower may be changed. In this case, for example, if the player A and the player B have a close relationship with each other on the basis of the result of comparison in the relationship described above by the comparison unit 253, the information processing unit 251 may transmit to the mobile terminal 100A of the player A information concerning any other player's tower (the player B's tower) in which the number of coins required to visit the player B's tower has been changed to a smaller value. This configuration can provide distinct identification of a connection between players, and can motivate a player to visit other players' towers or motivate a larger number of other players to visit the player's tower, facilitating the promotion of interaction among players.

Furthermore, according to an alternative exemplary embodiment, each player may form a group with a plurality of other players. In this configuration, information on other players who can visit the player's tower or information on other players' towers that the player can visit may be shared within the group. For example, in a case where one player within the group can visit the player A's tower, the other players within the same group may also be able to visit the player A's tower. In this configuration, for example, information concerning the group may be stored in the storage unit 260 of the server 200. The information concerning the group is updated in accordance with the status of the players who progress through the game, which is periodically transmitted from the mobile terminals of the individual players. Further, the information concerning the group may also be stored in the storage unit 160 of the mobile terminal 100A, and information concerning the other players within the group may be transmitted periodically (such as when the game starts or when a screen transition occurs) from the server 200 to update the information. This configuration can make even a player such as a novice of the game whose tower has a small number of visits of other players belong to a group, enabling an increase in the number of other players who can visit such a player's tower, resulting in the player being able to actively interact with the other players. In addition, an enhanced entertaining game experience can be provided for a novice of the game.

In the foregoing description, exemplary embodiments have been described in which a computer functions as a mobile terminal (client device) and a game program is executed by the mobile terminal as a so-called native application (native game). However, other exemplary embodiments of a computer and game program may be understood. For example, according to one exemplary embodiment, a computer may function as a server, and a game program may serve as a so-called web application (web game), with part or all of the game program being executed by the server, and with the result of the executed process being returned to a mobile terminal. In the foregoing description, furthermore, information concerning a player's tower, which is transmitted from the server 200 to a mobile terminal of any other player, may be transmitted from the mobile terminal of the player directly to the mobile terminal of the other player. That is, data may be transmitted and received via communication between mobile terminals.

According to an exemplary embodiment where the result of the game is displayed through a web browser, the mobile terminal 100A can accumulate information received from the server 200 in, for example, a predetermined storage area (web storage) included in the web browser.

In this manner, a configuration may be used in which some or all of the functional units (particularly, the control unit 150) included in the mobile terminal 100A in the foregoing description may be included in the server 200, and wherein the server 200 transmits the output result of the game to the mobile terminal 100A in accordance with input given to the mobile terminal 100A. This configuration allows the server 200 to achieve advantages similar to those achievable by the mobile terminal 100A when the mobile terminal 100A provides the individual functions.

For example, according to an exemplary embodiment, the reward providing unit 154 of the mobile terminal 100A may determine any other player which is provided with a reward specific to an own game area associated with a player on the basis of the comparison result of the status of a plurality of other players who progress through the game in the own game area, while this process is performed by the reward providing unit 255 of the server 200 in the foregoing description. The reward provided by the reward providing unit 154 may be at least partially different for each of a plurality of game areas. In addition, the reward providing unit 154 provides different rewards to other players who progress through the game in the own game area associated with the player, in accordance with the status of the player's progress through the game in a game area different from the own game area or any other game area.

In addition, the comparison unit 156 of the mobile terminal 100A may compare the status of a plurality of other players who progress through the game in an own game area associated with a player, while this process is performed by the comparison unit 253 of the server 200 in the foregoing description. Further, the comparison unit 156 may compare the stage of any other game area associated with any other player with the stage of the own game area.

In some further examples, a game may be a hybrid game in which some of the processes are performed by each of the server 200 and the mobile terminal 100A in such a manner that, for example, a game progress screen is displayed on the mobile terminal 100A on the basis of the data generated by the server 200 in web display mode and other menu screens and the like are displayed in native display mode by using a native application installed on the mobile terminal 100A.

In addition, according to an exemplary embodiment, the mobile terminal 100A and other mobile terminals, e.g., the mobile terminals 100B and 100C, may be connected to each other so as to be capable of performing communication (called peer-to-peer communication), and may be synchronized with each other to provide multiplayer gameplay.

In addition, the control method described above may not only include the processes described above with reference to the flowcharts but may also optionally include processes executed by the components included in the control units 150 and 250.

In the foregoing description, a game implemented by a game program according to an embodiment of the present invention has been described in the context of a battle game in a tower setting. However, according to other exemplary embodiments, a game program according to an embodiment of the present invention may be implemented as any of a wide variety of games, examples of which include business simulation games, farm simulation games, and character-raising games.

Furthermore, the mobile terminals 100A to 100C are not limited to smartphones. Each of the mobile terminals 100A to 100C may be any device so long as the device is an information processing device capable of implementing the functions described in the first embodiment described above, and examples of the device may include a mobile phone, a personal computer (PC), and a tablet terminal. Furthermore, while the embodiment described above has been described in the context of a game across three mobile terminals, the present invention is not limited to this embodiment and more than three mobile terminals may be used.

Furthermore, the control units 150 and 250 of the mobile terminal 100A and the server 200 may be each implemented by a logic circuit (hardware) mounted on an integrated circuit (IC) chip or the like, or may be implemented by software by using a central processing unit (CPU). In the latter case, each of the mobile terminal 100A and the server 200 may include a CPU that executes a command of a game program, which is software implementing the individual functions, a read only memory (ROM) or a storage device (collectively referred to as a "recording medium") on which the game program and various kinds of data are recorded in computer-readable (or CPU-readable) form, a random access memory (RAM) onto which the game program is loaded, and so forth. The computer (or CPU) may read the game program from the recording medium and executes the game program. Examples of the recording medium described above may include "non-transitory tangible media", such as a tape, a disc, a card, a semiconductor memory, and a programmable logic circuit. The game program may be supplied to the computer via any type of transmission medium (such as a communication network or broadcast waves) capable of transmitting the game program. According to an exemplary embodiment, this may include data signals embedded in a carrier wave in which the game program is embodied by electronic transmission.

The game program described above may be implemented by using a script language such as ActionScript or JavaScript®, an object-oriented programming language such as Objective-C or Java®, a markup language such as HTML5, or any other suitable language. Furthermore, according to an exemplary embodiment, a game system may include an information processing terminal (e.g., the mobile terminal 100A) which includes components implementing the respective functions implemented by the game program described above, and a server may include components implementing other functions different from the functions described above.

While the present invention has been illustrated and described in connection with the drawings and an embodiment thereof, it should be appreciated that a person skilled in the art could, in light of the teachings of the present disclosure, readily make a variety of changes and modifications. It should therefore be noted that such changes and modifications fall within the scope of the present invention. For example, functions included in means, steps, and the like are reconfigurable so that logical consistency may be maintained, and a plurality of means, steps, and the like may be combined into a single one or divided into multiple ones. In addition, the configurations illustrated in the embodiments described above may be combined as necessary.

Exemplary embodiments such as those described above may be widely applicable to any kind of computer such as a smartphone, a tablet terminal, a mobile phone, a home game console, a personal computer, a server, a workstation, or a mainframe.

Other exemplary embodiments of a game implemented by a game program may also be described.

In the virtual space of a game, "players' towers" (game spaces) each associated with one of a plurality of players may be present, and an individual player may be able to play the game not only in the player's tower but also in any "other player's tower" associated with any other player. A plurality of players of the game may be able to asynchronously play the game in a plurality of towers that are present. The term "game in a tower" refers to a game that encourages a player character (game medium) of a player to explore the inside of the tower in a limited number of turns and defeat an enemy character that the player character encounters while acquiring items to proceed with the conquest of the tower. When the player successfully conquers floors up to the top floor of the "player's tower", the player can increase the number of floors of the tower. Accordingly, each player can increase the number of floors of the "player's tower" (or any "other player tower" for another player). Thus, even if a player conquers floors up to the top floor of any "other player tower" at a certain point in time, the number of floors of the "other player tower" may be larger the next time the player logs in to the game than when the player conquered the top floor of the tower.

In the virtual space of the game, additional game spaces other than the above-described towers associated with the individual players, such as a "common tower", a "battle tower", an "event tower", and a "quest", may be present. The additional game spaces such as the towers and the quest described above are game spaces not associated with any players but managed on the server (supervisor) side. In any of these game spaces, every player aims to conquer the top floor or the bottom level by causing the player character to explore the inside. The "common tower" is a tower that every player can conquer in common. In the "common tower", players can encounter and greet each other while exploring the inside, or a plurality of players may be ranked according to the state of conquest of the "common tower". The "battle tower" is a tower in which players may fight against each other, and an opponent that a player character encounters in the tower may be any other player character. The "event tower" may be a tower related to an in-game event held for a certain period. The "event tower" may be a tower that appears in a predetermined condition in accordance with the progress of each player through the game, and allows the player to gain a special reward by exploring the inside. The "quest (e.g., an object displayed in a fashion like a bottomless well)" may allow a player to encounter an enemy character different from that in any of the towers described above or to gain a special reward.

In addition, each player can explore a game area such as any of the towers described above together with, a duplicate of any other player character, which has been acquired by the player through a random lottery ("gacha"), as a companion character. Each player can further place a companion character acquired through a random lottery in the player's tower as a defensive character that serves to defend the player's tower. Furthermore, an "achievement list" that is a list of items achievable for a player of the game is set, and a reward is provided to the player when the player has achieved an item on the list. The items in the achievement list may include, for example, "log in to the game on ten or more days", "take out 50 or more items in total from all the towers", "encounter other players ten or more times within a tower", and "visit other players' towers ten or more times". The foregoing is a brief summary of the game.

An exemplary embodiment may be described in detail hereinafter with reference to some drawings. According to such an exemplary embodiment, a computer may function as a server, part of a game program may be executed by a terminal as a so-called native application (native game), and a result of a process executed may be returned to the server. Specifically, a process for causing a game to progress in a game space and a process for playing a random lottery ("gacha") may be performed by each mobile terminal, and a process for determining a provided entity through a random lottery ("gacha") may be performed by the server, which will be described in detail below.

Figure 17:
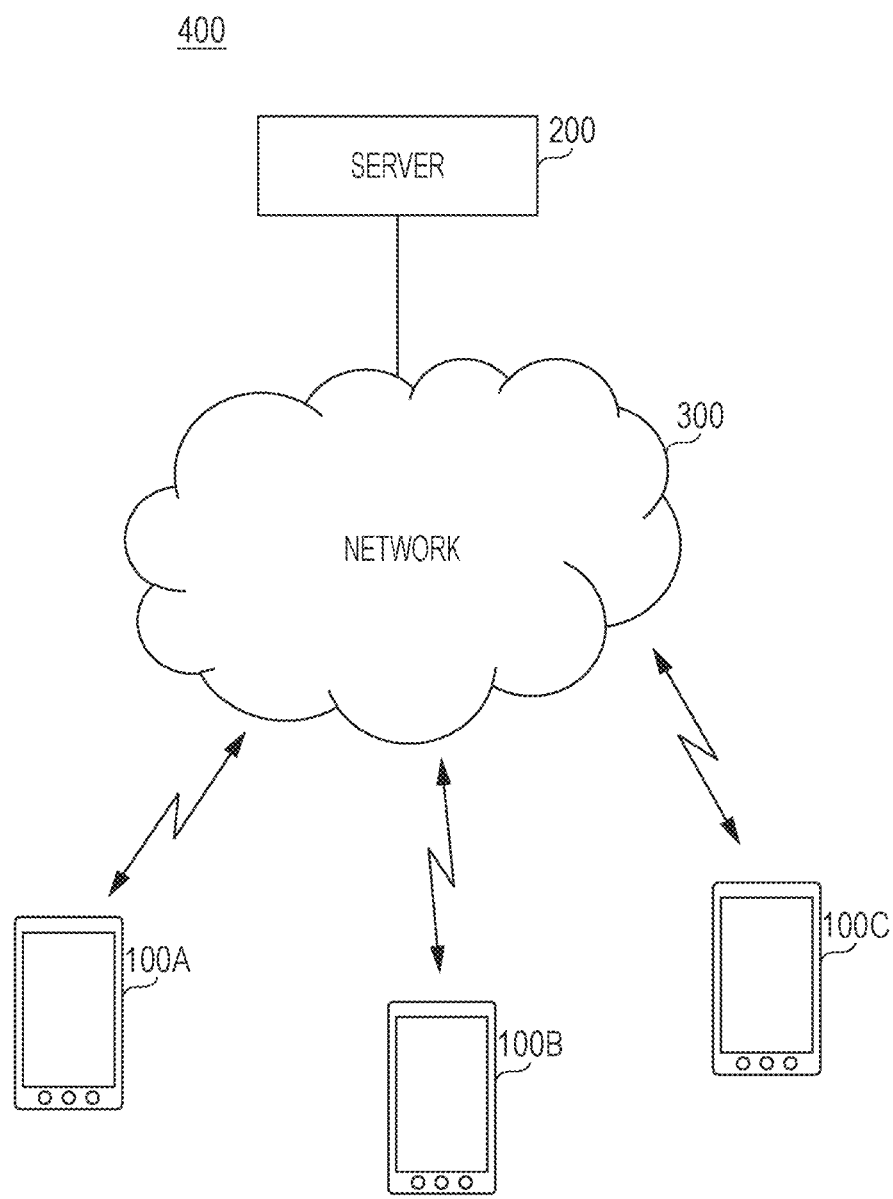
FIG. 17 is a schematic diagram of a game system configuration according to a second embodiment of the present invention.

FIG. 17 is a schematic diagram of an exemplary embodiment of a game system configuration. As illustrated in FIG. 17, a game system 400 may include a plurality of mobile terminals 100A, 100B, and 100C and a server 200. The server 200 may be connected to the mobile terminals 100A to 100C via a network 300. In FIG. 17, only three mobile terminals are illustrated, for simplicity of illustration. It is to be understood that more than three mobile terminals may be present.

The mobile terminals (computers) 100A to 100C may be information processing devices each capable of executing a game program including processes described below. Mobile terminals may be any of a variety of devices so long as the devices are capable of executing the processes described below, and examples of the device may include smart-phones, tablet terminals, home game consoles, mobile phones, personal computers, and other electronic devices. The game program described above may be particularly suitable for execution by a multifunction device (such as a smartphone) having a display (display unit), an input screen on which a touch is detectable, a memory, and one or more processors capable of executing one or more programs stored in the memory.

Figure 18:
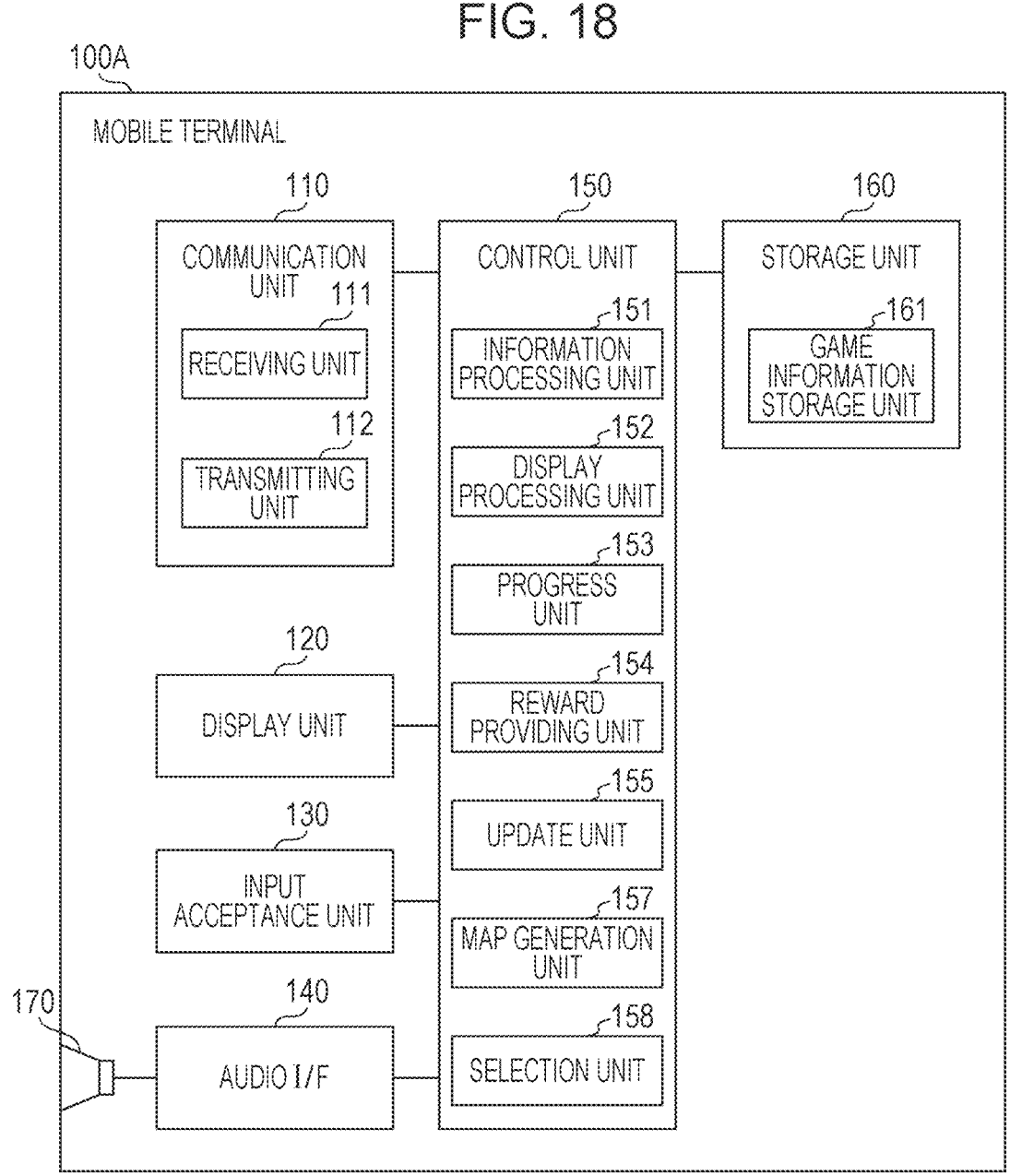
FIG. 18 is a block diagram illustrating an example of a mobile terminal according to the second embodiment of the present invention.

FIG. 18 is a block diagram illustrating an example configuration of a main part of the mobile terminal 100A. While a description is given here of the configuration of the mobile terminal 100A, other mobile terminals, such as mobile terminals 100B and 100C, may have a configuration similar to that of the mobile terminal 100A.

As illustrated in FIG. 18, the mobile terminal 100A includes a communication unit 110, a display unit 120, an input acceptance unit 130, an audio interface (I/F) 140, a control unit 150, a storage unit 160, and a speaker 170.

The communication unit 110 includes a receiving unit 111 and a transmitting unit 112, and may communicate with the server 200 via the network 300. The communication may be implemented via wired or wireless connection, and any communication protocol that makes mutual communication feasible may be used. As described in detail below, the receiving unit 111 receives information concerning game media (player characters) associated with players, which may be duplicated by a duplication unit 257 of the server 200 so that the duplicates can be used as objects to be provided. The transmitting unit 112 may transmit, to the server 200, information concerning a player character serving as a provided entity selected by a selection unit 158 and is acquired by the player.

The display unit 120 is a device that displays a game screen. In this embodiment, the display unit 120 may be a liquid crystal display. In FIG. 18, the input acceptance unit 130 and the display unit 120 are illustrated as separate components in order to distinctly identify the respective functions of the input acceptance unit 130 and the display unit 120. However, these components are preferably formed into a single unit, for example, when the input acceptance unit 130 is a touch panel and the display unit 120 is a liquid crystal display.

The input acceptance unit 130 may be configured to accept an operation input by the player. In this embodiment, the input acceptance unit 130 may be a touch panel capable of multi-touch detection. The input acceptance unit 130 may detect a touch position touched by the player with their finger or any other pointing device such as a stylus, and may transmit information concerning the coordinates of the detected position to an information processing unit 151. In this embodiment, the input acceptance unit 130 may accept an operation input by the player on a game medium (character), or other operations such as taps on various icons and menu buttons displayed on the display unit 120. An operation input by the player may not necessarily be accepted by using a touch operation on the touch panel, and may be accepted by, for example, the player pressing a predetermined input key, or by another indication of acceptance, as desired.

The audio I/F 140 may be an interface for the speaker 170 or earphones (not illustrated). When reproducing sound effects, background music (BGM), or the like in a game, the control unit 150 may signal audio to be output from the speaker 170 or the earphones via the audio I/F 140.

The control unit 150 may be a processor configured to control the individual components of the mobile terminal 100A. The control unit 150 includes the information processing unit 151, a display processing unit 152, a progress unit 153, a reward providing unit 154, the update unit 155, a map generation unit 157, and the selection unit 158. The information processing unit 151 may obtain coordinate information transmitted from the input acceptance unit 130 at predetermined time intervals, and may output information on the sequence of coordinates to the individual components as a trajectory. The display processing unit 152 may convert display data transmitted from the information processing unit 151 or any other functional unit into pixel information, and may output the pixel information to the display unit 120.

A brief description will be given of the function of the other components of the control unit 150, which will be described in detail below. The progress unit 153 may receive operation input information from the player through the input acceptance unit 130, and may be configured to cause a game to progress in a game space. The reward providing unit 154 may provide a reward to a player of the game on the basis of the progress of the game caused to progress by the progress unit 153. The update unit 155 may update parameters regarding a game medium associated with the player in accordance with the progress of the player through the game. The map generation unit 157 generates, for each of a plurality of players who plays the game, a map for a plurality of game areas. The selection unit 158 may select, in accordance with information concerning a plurality of player characters to be provided, which have been duplicated by the duplication unit 257 of the server 200, a player character serving as a provided entity from among the player characters to be provided.

The storage unit 160 may include a game information storage unit 161. The storage unit 160 may be or may include any recording medium such as an HDD, an SSD, or a flash memory, or any other recording medium as desired. Storage unit 160 may have a function of storing various programs or various kinds of data necessary for the mobile terminal 100A to operate. That is, the storage unit 160 may store information (a game program and data) on a game downloaded by the player from a game server over the network 300 and installed into the mobile terminal 100A.

The game information storage unit 161 stores information on a game medium (player character) assigned to the player, which is necessary for the game to progress, items acquired by the player, and game information data such as decorative elements in the game space.

Figure 19:
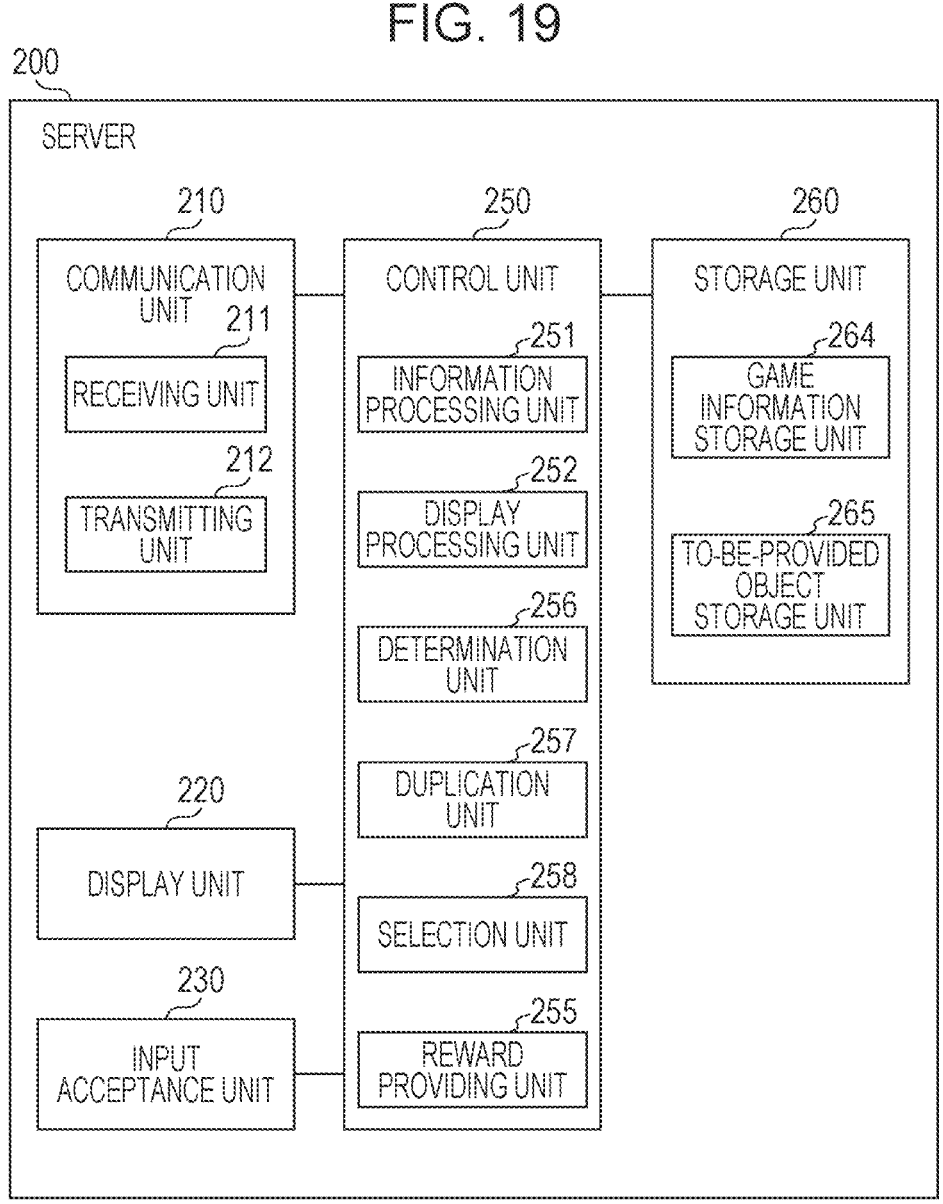
FIG. 19 is a block diagram illustrating an example of a server according to the second embodiment of the present invention.

FIG. 19 is a block diagram illustrating an example configuration of an exemplary embodiment of a main part of the server 200. As illustrated in FIG. 19, the server 200 includes a communication unit 210, a display unit 220, an input acceptance unit 230, a control unit 250, and a storage unit 260.

The communication unit 210 may include a receiving unit 211 and a transmitting unit 212, and may have a function of performing communication with the mobile terminals 100A to 100C via the network 300 in accordance with an instruction given from the control unit 250. That is, the communication unit 210 may transmit and receive data regarding the game to and from the mobile terminals 100A to 100C. As described in detail below, the transmitting unit 212 may transmit, to the mobile terminal 100A of a player of the game, game media associated with players, which have been duplicated by the duplication unit 257, as objects to be provided. The receiving unit 211 receives acquisition information including information concerning a game medium acquired by the player of the game as a provided entity from among the game media to be provided which are transmitted by the transmitting unit 212.

The display unit 220 may be implemented by a liquid crystal display or a monitor, and may display information necessary for the game supervisor to control the server 200. The input acceptance unit 230 may be implemented by a keyboard or a touch pad, and may accept operation input necessary to control the server 200.

The control unit 250 is a processor that may be configured to control the individual components of the server 200. The control unit 250 may include an information processing unit 251, a display processing unit 252, a determination unit 256, the duplication unit 257, a selection unit 258, and a reward providing unit 255. The information processing unit 251 may perform various processing operations on the operation input information input from the input acceptance unit 230 and information transmitted and received by the communication unit 210. The display processing unit 252 may process various kinds of data to be displayed on the display unit 220 or display units of the mobile terminals 100A to 100C.

As described in detail below, according to an exemplary embodiment, the determination unit 256 may determine whether or not the status of a player's progress through the game satisfies a predetermined condition. The determination unit 256 may determine whether or not the status of the player's progress through the game satisfies a predetermined condition at predetermined timing. The determination unit 256 may further determine the order of a plurality of players on the basis of the progress of the game, and may determine that the status of the player's progress through the game satisfies a predetermined condition when the player is ranked high.

The duplication unit 257 may duplicate the game medium of the player for which it is determined by the determination unit 256 that the predetermined condition is satisfied, while maintaining the parameters of the game medium acquired at the time of determination (at predetermined timing). In accordance with an acquisition request from the player of the game, the selection unit 258 selects a game medium that the player is made to acquire as a provided entity from among the game media to be provided, which are stored in a to-be-provided object storage unit 265. Some of the parameters of the game medium selected by the selection unit 258 are restricted from being updated in accordance with the progress of the player who has acquired the game medium through the game.

The reward providing unit 255 may provide a reward to a player corresponding to a specific game medium to be provided, in accordance with the number of times the game medium has been selected as a provided entity by the selection unit 258 or the number of times the game medium has been selected as a provided entity by the selection unit 158 of the mobile terminal 100A. Information concerning the number of times a game medium has been selected by the mobile terminal 100A may be included in acquisition information transmitted from the mobile terminal 100A of the player. The reward providing unit 255 may further provide a reward to a player corresponding to a game medium selected as a provided entity by the selection unit 258 or selected as a provided entity by the selection unit 158 of the mobile terminal 100A and acquired by the player of the game, in accordance with how the game medium is used by the player in the game.

The storage unit 260 may be configured to store or hold various programs and data necessary for the server 200 to operate. The storage unit 260 may include a game information storage unit 264 and the to-be-provided object storage unit 265. The game information storage unit 264 stores various kinds of data necessary for the game to progress. That is, the game information storage unit 264 stores a game medium assigned to a player in association with the player. The to-be-provided object storage unit 265 stores a game medium specific to a player, which has been duplicated by the duplication unit 257, as an object to be provided. According to an exemplary embodiment, the storage unit 260 may be or may include any of various recording media such as an HDD, an SSD, and a flash memory.

Figure 20:
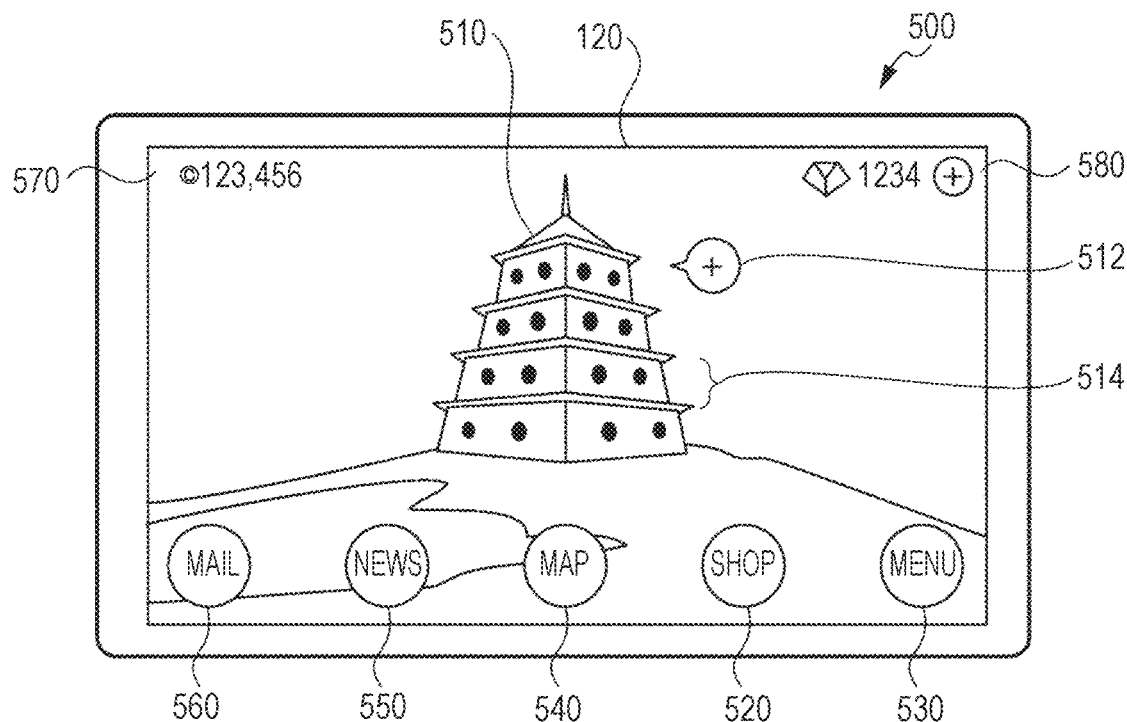
FIG. 20 illustrates an example game screen (start screen) according to the second embodiment of the present invention.

An exemplary embodiment of a game implemented by a game program may be described with reference to FIGS. 20 to 23. FIG. 20 is a diagram illustrating an example game start screen displayed on the display unit 120 of the mobile terminal 100A. In the following description, a player who owns the mobile terminal 100A is represented by a player A, a player who owns the mobile terminal 100B is represented by a player B, and a player who owns the mobile terminal 100C is represented by a player C. While the description will be given of the mobile terminal 100A, the same applies to the mobile terminals 100B and 100C.

As illustrated in FIG. 20, a start screen 500 shows the player A's tower (own game area) 510, a shop ("SHOP") button 520, a menu ("MENU") button 530, a map ("MAP") button 540, a news ("NEWS") button 550, a mail ("MAIL")

button 560, the number of coins 570, and the number of gems 580. Information (such as a program or image data) for displaying the start screen 500 may be stored in the game information storage unit 161 of the mobile terminal 100A. The display processing unit 152 may generate information for displaying the start screen 500 by using the information stored in the game information storage unit 163, and may output the generated information to the display unit 120.

Tapping on the tower 510 allows the player A to make their player character, namely, a player character A, enter the tower 510. The player A makes the player character A move within the tower 510 in a limited number of turns and fight against an enemy character that the player character A has encountered. The player character A wins the fight to obtain an experience value and grow, and can further acquire a coin. In addition, there is a treasure chest within the tower 510, and the player character A can acquire an item in the treasure chest as a reward. The acquired item may be a set of arms or a defensive weapon such as protective clothing or an accessory such as a necklace or a ring, which determines the characteristic values of the player character A, such as defense ability, attack ability, speed, and luck. The player A can set a weapon or an accessory with which the player character A is to be equipped in order to defeat an enemy character. When a fight is set up between the player character A and an enemy character, the progress unit 153 may perform parameter calculations based on the characteristic values of the player character A, which are determined based on the equipment of the player character A, such as defense ability, attack ability, speed, and luck, and the characteristic values of the enemy character, and determines the amounts of damage that the respective characters receive. The character by which the total amount of damage received exceeds the total number of hit points (HP) possessed is the loser.

An exemplary embodiment of the game described above may proceed as follows. First, the input acceptance unit 130 accepts a tap operation or slide operation of the player A (detects a tap operation or a slide operation on the touch panel), and transmits coordinate information to the information processing unit 151. The information processing unit 151 transmits information to the progress unit 153, such as whether an instruction given by the player A indicates a tap and, if the instruction indicates a slide, in which direction to slide. The progress unit 153 determines the direction of movement of the player character A on the basis of the slide operation performed by the player A, and issues an instruction to update the display screen (such as the appearance of an enemy character or a treasure chest or the transition to a tower inside screen). As described above, the progress unit 153 also performs parameter calculations for a battle against an enemy character.

Each player character may be assignable with parameters such as skills indicating special abilities which are feasible and jobs indicating the abilities of the player character or growing abilities. In addition, when starting a game, each player may perform selection to set parameters such as an appearance and items specific to their player character. Furthermore, each player may be able to make their player character grow, or combining items, skills, and jobs may allow a character specific to each player to grow. Information on such parameters is stored in the storage unit 160 of the mobile terminal 100A or the storage unit 260 of the server 200.

According to an exemplary embodiment, the tower 510 may be a three-story tower in the initial state of the game. When a player wins a battle ("boss battle") against a boss enemy on the top floor of the tower 510, a button 512 for increasing the number of floors of the tower 510 may be displayed. The player A may tap on the button 512 and spends a preset coin to add a floor to every three floors 514. An enemy character on a higher floor may have higher defense ability or attack ability, and the characteristic values of an item which can be acquired may be set higher. The information described above may be stored in the game information storage unit 163. Boss enemies may be located on every three floors (such as the third, sixth, and ninth floors) of the tower 510. A player who wins a boss battle can escape from the tower 510 carrying acquired items with them. A player whose number of turns reaches zero or who loses a boss battle or escapes from the tower 510 during exploration is not allowed to take acquired items from the tower 510.

A plurality of players of the game are each associated with a tower such as that on the start screen 500, and each player may be able to visit another player's tower (any other player tower) to play a battle game such as that described above in the other player's tower.

Referring back to the start screen 500, according to an exemplary embodiment, tapping on the shop button 520 allows the player A to display a screen for a virtual shop in the game. In the virtual shop, the player A can use acquired coins or gems to purchase an item or summon a companion character. The coins and gems are virtual currency that a player spends to purchase an item in the game, summon a companion character, or enter any other player's tower or the battle tower. The menu button 530 is a button for displaying a menu screen to make the game progress. The menu screen shows, for example, a game score (e.g., the maximum number of floors reached, etc.) that is information concerning the status of the player's progress through the game in the player's tower, any other player's tower, the common tower, or the battle tower, a button to switch to a screen for setting the equipment of the player character, and a button to switch to an item management screen.

According to an exemplary embodiment, the map button 540 is a button to transition to a map screen on which any other player's tower that the player A can visit or the common tower is displayed. The news button 550 allows a message to be displayed in accordance with the progress of the game. Examples of the message may include "expansion (adding a floor) of a tower is available", "another player visited this tower", "the functions available to the player A have been released", and "information on any other player's tower has been updated". The map button 540 and the news button 550 may also each be displayed with an exclamation mark if there is any information that remains unchecked by the player A. The shop button 520 and the map button 540 may be displayed when the tower 510 is nine or more floors high.

The mail button 560 may be displayed by the display processing unit 152 in accordance with information received from the server 200 when there is any announcement from the supervisor of the game. Tapping on the mail button 560 allows the player A to display the announcement on the display unit 120. Start screen 500 may also show a number of coins 570, which may indicate the total number of coins that the player A currently owns.

The number of gems 580 shows the number of gems owned by the player A. According to an exemplary embodiment, tapping on a plus (+) button located near the number of gems 580 allows the player A to make the display unit 120 transition to a gem purchase screen.

According to another exemplary embodiment, a map may be displayed by the player A tapping on the mail button 540.

Figure 21:
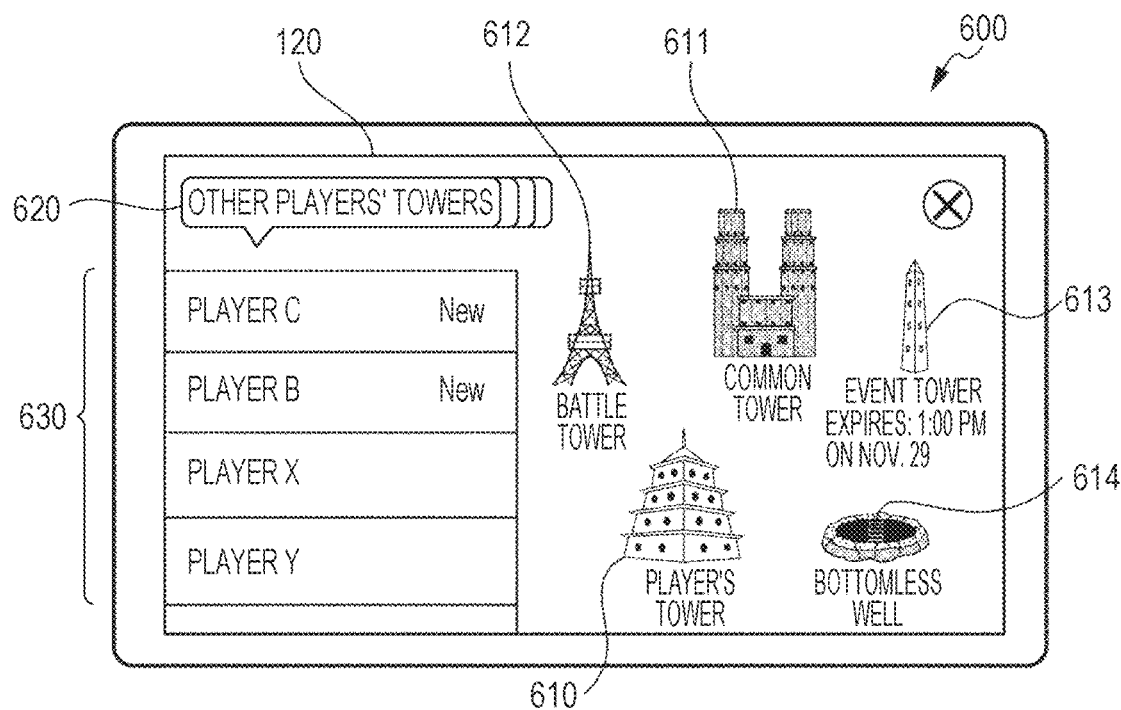
FIG. 21 illustrates an example game screen (map) according to the second embodiment of the present invention.

FIG. 21 is a diagram illustrating an example of a map displayed on the display unit 120. The illustrated map may be generated by the map generation unit 157 of the mobile terminal 100A. Alternatively, the server 200 may generate a map, and map information for displaying the map may be transmitted to the mobile terminal 100A. As illustrated in FIG. 21, a player's tower (the player A's tower) 610, a common tower 611, a battle tower 612, an event tower 613, and a quest (bottomless well) 614 are displayed on a map 600. A tab menu 620 and a list 630 are also displayed. The player A can tap on the map 600 to select the destination.

The tab menu 620 may show "Other players' towers" that the player A can visit—for example, by selecting the tab— and may also show any of "Exploration history", "Favorites", and "Other towers accessible to player A", which are not illustrated in FIG. 21. In FIG. 21, the list 630, which is a list of "other players' towers" that the player A can visit, is illustrated. As illustrated in FIG. 21, the player A can visit at least "the player C's tower", "the player B's tower", "a player X's tower", and "a player Y's tower".

As in the player A's tower, the game in any other player's tower also aims to encourage a player to fight against an enemy character while acquiring items and to win a boss battle against a boss enemy on the top floor of the other player's tower. As in the player A's tower, the player who wins boss battles against boss enemies on every three floors and successfully escapes from the other player's tower can take items acquired in the other player's tower. In addition, coins acquired by the player in the other player's tower can not only be taken with them but can also be recorded in a battle record in the other player's tower.

Other towers may be displayed on the map 600. As described above, the player's tower 610 is a game space associated with the player A, and the height of the tower 610 can be increased in accordance with the conquest of the player A.

The common tower 611 may be a tower that every player can conquer. In the common tower 611, each player aims to conquer the top floor while fighting against an enemy character or a boss enemy that the player encounters. Also in the common tower 611, each player can acquire an item in a treasure chest and make their character wear the item. The player may be required to spend a coin in order to enter the common tower 611, and fights against a higher-skill enemy character or acquires more valuable reward items as they proceed to a higher floor. The height of the common tower 611 does not change depending on the user. On the contrary, the supervisor of the game may change the height of the common tower 611 in accordance with the progress of each user through the game. In the common tower 611, the player may encounter another player character, which may include a player character whose player is playing the game at the same time, or a player character whose player is not currently playing the game. The player may encounter another player character which is selected by the game program and displayed. That is, each player may play a game synchronously with another player or may play a game asynchronously, in which case the status of the player's progress through the game may be stored in the server 200 and any other player character may be selected by the server 200 based on the stored status of the player's progress through the game.

According to an exemplary embodiment, the results (scores) of play of the game by individual players in the common tower 611 are recorded, and the ranks of the players are determined according to an item, such as the number of coins acquired, the number of visits, the number of floors reached, or the achievement level. Each player may progress through a battle game in the player's tower 610, any other player's tower, or the common tower 611, and aims to acquire a weapon or an accessory that increases parameters such as attack ability, protective ability, and speed to increase the ability of their character and to boost their ranking. Items such as weapons or accessories can be acquired by using the shop button 520 illustrated in FIG. 20 and spending gems.

For example, player characters associated with players ranked in top 100 in the ranking in the common tower may be stored (or held) in the server 200 as provided entities at predetermined timing such as at 0:00 am on the last day every month or 0:00 am every Sunday. The player characters serving as provided entities are each duplicated while the parameters obtained at the predetermined timing are maintained. As described above, each player of the game is able to acquire any other player character stored as a provided entity through a random lottery ("gacha"). Provided entities may be stored in the server 200 in addition to the existing provided entities, or some or all of the existing provided entities stored in the to-be-provided object storage unit 265 of the server 200 may be replaced with provided entities. In a case where provided entities are additionally stored, the stored provided entities, the number of which has reached a predetermined value (e.g., 300), may be updated with new provided entities. Such conditions may be stored in the storage unit 260, and the duplication unit 257 may perform a process of duplicating a provided entity in accordance with a condition. Alternatively, the parameters of a player character to be provided may be changed on the basis of the history of the object to be provided. For example, if a player character of a player ranked high in the latest ranking has been previously used as a provided entity as a result of the determination at predetermined timing, the parameters of the character serving as a provided entity may be changed from the parameters obtained at the predetermined timing in accordance with the number of times the player character has been used as a provided entity or the period during which the player character was used as a provided entity. For example, a parameter of the player character, such as the HP, may be increased. In this case, the duplication unit 257 may refer to the history of an object to be provided, which is stored in the to-be-provided object storage unit 265 of the server 200, and change the parameters of the player character on the basis of, for example, whether or not the player character has been previously selected as a provided entity, the number of times the player character has been previously an object to be provided, the period during which the player character was an object to be provided in the past, and the like.

Tapping on the shop button 520 on the start screen 500 illustrated in FIG. 20 allows a menu screen to be displayed, and the player can select a menu such as "purchase an item" or "summon a companion character". When the player selects "summon a companion character", the player can acquire (summon) one player character through a random lottery from among player characters stored in the server 200 as provided entities. A plurality of companion characters may be acquired in accordance with the number of times the player has played a random lottery. The random lottery ("gacha") is a selection method in which a player character stored as a provided entity is randomly selected in accordance with a predetermined probability of occurrence. The player can accompany the acquired other player character as a companion character in exploring the battle tower 612 or the common tower 610. The random lottery method may involve setting in advance the order in which player characters appear, and selecting a player character by the selection unit 258 in accordance with the order. Information such as the probability of occurrence and the order is stored in advance in the storage unit 160 or 260. Alternatively, a provided entity may be obtained by using a combination of a random lottery based on a predetermined probability of occurrence and a selection based on a preset order. This configuration includes, for example, a configuration in which a plurality of patterns of orders are set and a random lottery is performed by using one of the patterns.

The battle tower 612 may be a tower in which the player character A of the player A fights against another player character of another player. According to an exemplary embodiment, the battle tower 612 may not be displayed on the map 600 until the player's tower 610 meets a predetermined condition n; for example, when the player's tower 610 becomes twelve or more floors high, the player A may be able to explore the battle tower 612. In the battle tower 612, the player A may encounter another player character as an opponent character. Another player who controls the other player character that the player A encounters may not necessarily be playing the game at the same time, and any other player character satisfying a predetermined condition is selected by the game program and is displayed to the player A. As described above, the player A can explore the inside of the battle tower 612 together with, as a companion character, a duplicate of any other player character acquired by the player A through a random lottery ("gacha").

As described above, according to the second embodiment of the present invention, each player's player character which satisfies a predetermined condition at predetermined timing is set as a provided entity through a random lottery ("gacha") for a game in a game space (the common tower 611). Since a provided entity is set at predetermined timing, the player's enthusiasm for the game can be aroused to encourage satisfying the condition by the predetermined timing. Furthermore, selection based on the score at predetermined timing yields provided entities including effective (powerful) player characters for the game configuration at the timing. A player who plays a random lottery (or "gacha") needs a player character which is effective on the current game configuration. Adjusting the timing as appropriate allows an effective player character to be set as a provided entity in accordance with the situation even if the state of the game changes (e.g., an event takes place or an update occurs).

In addition, it may be difficult for a novice of the game to win fights in the battle tower 612 since their player character can be equipped with a small number of items or has a low experience value, and continuously losing at the game may cause the player to lose motivation to participate in the game. If the player is able to acquire a powerful companion character through a random lottery, the player would more probably win fights, and even a novice can enjoy the game. According to an embodiment of the present invention, since a companion character acquired through a random lottery will be associated with a high-ranked player (high-score player) of the game in the common tower 611, a player can easily acquire a high-ability companion character. This can provide the player with an enhanced entertaining game experience. In addition, the player may be motivated to increase the ability of their character so that the character can be registered as a provided entity in order to receive the honor of being used as a companion character. Accordingly, the player can be motivated to repeatedly play the game.

The event tower 613 may be displayed on the map 600 when a predetermined condition is satisfied. For example, when the player A wins battles in the battle tower 612 and completes the conquest of the top floor or when the player A is ranked in top ten according to the score in the common tower 611, the player A may be able to explore the event tower 613. In the event tower 613, for example, the player A can be encouraged to acquire items in absence of an enemy character or can obtain a special reward by winning a fight against a special enemy character that appears, in accordance with the content of the event. The bottomless well 614 is a game space in which the player A can encounter an enemy character different from that in the common tower 611 or the player's tower 610 or can acquire a special item.

Figure 22:
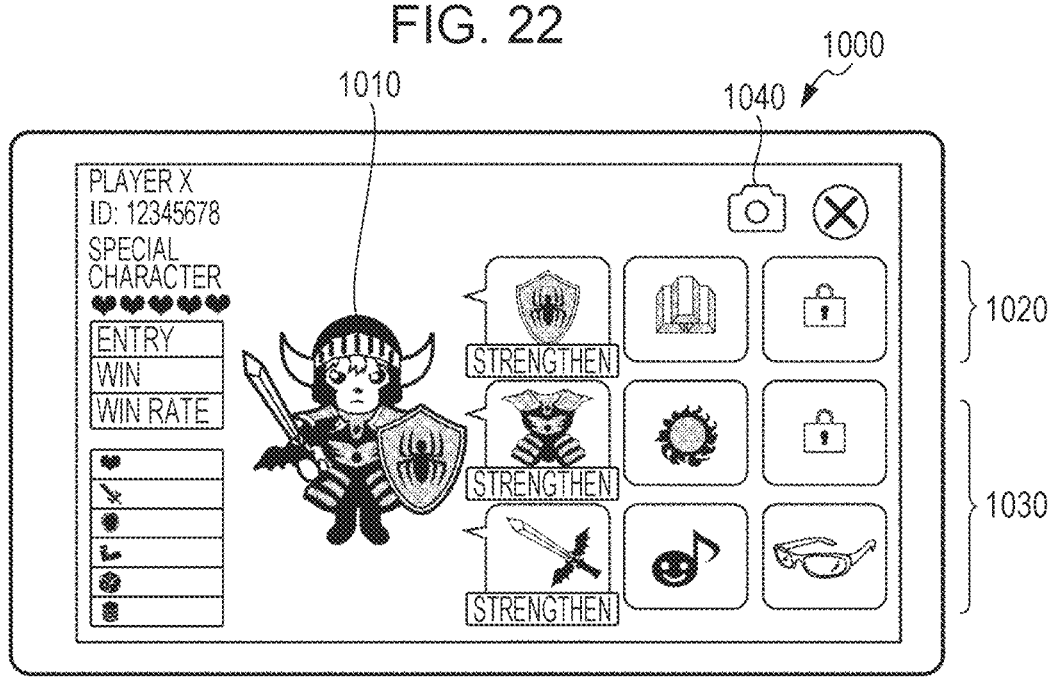
FIG. 22 illustrates an example game screen (companion character) according to the second embodiment of the present invention.

FIG. 22 illustrates an example game screen for displaying the details of a companion character which has been acquired by a player. As illustrated in FIG. 22, a game screen 1000 may include a companion character 1010, weapons 1020 with which the companion character 1010 is equipped, accessories 1030 with which the companion character 1010 is equipped, and a social sharing button 1040. The weapons 1020 and the accessories 1030 are items that a player character that is the source of the companion character 1010 was wearing when the player character was duplicated and the duplicate character was stored as a provided entity at predetermined timing. The player who has acquired the companion character 1010 may be restricted from modifying some of the parameters such as the weapons 1020 and the accessories 1030. For example, according to an exemplary embodiment, the player may not be allowed to change the weapons 1020 to other items (however, the player may be allowed to strengthen the weapons 1020). Similarly, the accessories of the player who has acquired the companion character 1010 can be updated with the accessories 1030 for equipment, though the player may not be allowed to acquire the accessories with which a companion character is equipped. In addition, if any other player character that is the source of a companion character exchanges a weapon on a game or acquires a new accessory, such a weapon or accessory may not be applied to the companion character.

Figure 23:
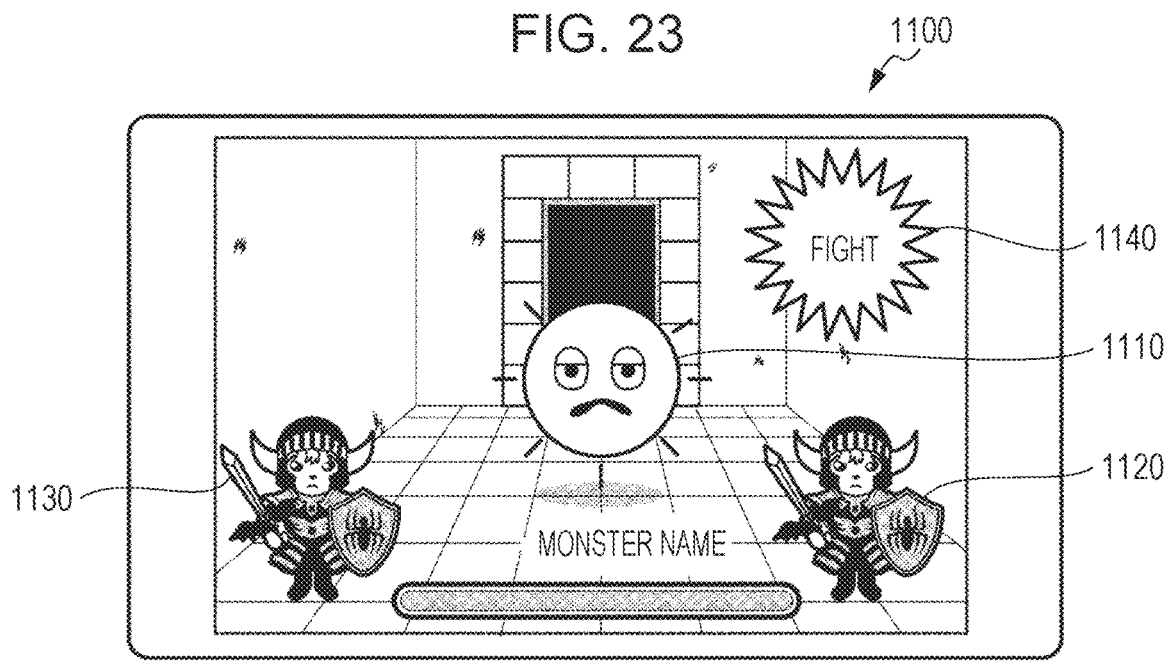
FIG. 23 illustrates an example game screen (battle screen) according to the second embodiment of the present invention.

FIG. 23 is a diagram illustrating an example game screen on which a player fights (battles) against an enemy character together with companion characters. As illustrated in FIG. 23, a game screen 1100 may include an enemy character 1110 and companion characters 1120 and 1130. Tapping on a "fight" button 1140 may allow the player to fight the enemy character 1110. As described above, since the outcome of the fight depends on the parameters of the respective characters, the parameters of the companion characters 1120 and 1130 can be the key to winning or losing the game.

As described above, according to an exemplary embodiment, restrictive modification of the parameters of a companion character which has been acquired can suppress proliferation of strong player characters to appropriately maintain the game balance. Specifically, some limitations on an acquirable player character with respect to an original player character that is the source of the player character can guarantee the superiority of a player who owns the original player character. This allows an increase in the strength of a player such as a novice, and also allows adjustment of the strength of players so that such a player does not easily achieve strength comparable to experts.

In addition, a player corresponding to a player character which has been acquired as a companion character a large number of times may be provided with a reward. For example, a configuration may be used in which the parameters of a player character are increased in accordance with the number of times the player character has been acquired as a companion character. Alternatively, a reward may be provided to a player to help the player progress through the game in accordance with the number of times the player's player character has been acquired as a companion character. The reward described above may be provided in accordance with use conditions as a companion character in the game. The term "use conditions", as used here, refers to the number of times the player character has been used as a companion character in the game or the period during which the player character was used as a companion character in the game, the number of times the player character has been made to grow by any other player who has acquired the player character, or the number of times any other player who has acquired the player character has won a battle together with the player character as a companion character, for example. Examples of providing a reward may include, specifically, encouraging a player to acquire an item with low probability of occurrence in the event tower, and making an enemy character appear to enable a player who has defeated the enemy character to acquire double or more coins.

In this manner, each player can obtain a reward in accordance with the number of times a duplicate of their player character has been acquired as a companion character. This can keep the player's enthusiasm for repeated play of the game to increase their ranking. In addition, each player can obtain a reward in accordance with the use of a duplicate of their player character as a companion character. This can provide a player with an enthusiastic experience to raise their character to higher levels.

A player who has acquired a companion character and a player ("source player") who controls a player character that is the source of the companion character may be made to interact with each other. For example, the player who has acquired the companion character may be able to transmit an email to the source player, or may be able to express a gratitude to the source player on an SNS. In this case, the game program may include a chat function to give players the opportunity to chat, or registration information on an SNS may be set at the time of start of the game so that information on players is stored in association with the SNS. Alternatively, the tower associated with the player who has acquired the companion character and the tower associated with the source player may be stored in association with each other. For example, the player who has acquired the companion character and the source player may be able to visit their counterpart's towers, or may be able to acquire more coins when they have conquered their counterpart's towers. Additionally, information on the player who has acquired the companion character and information on the source player may be stored in association with each other. For example, both players may be registered as friends, or may ask each other for preferential cooperation in the case of cooperative gameplay such as fighting an enemy in cooperation with a plurality of players. Furthermore, both players may be notified of information relating to a change in the parameters of the companion character or the player character of the source player. Specifically, when the companion character is equipped with equipment A having more powerful parameters, the source player may be notified of information on a quest in which the equipment A can be acquired, or a release may be performed so that the quest can be completed.

An exemplary embodiment as described above can encourage players to further interact via player characters.

Figure 24:
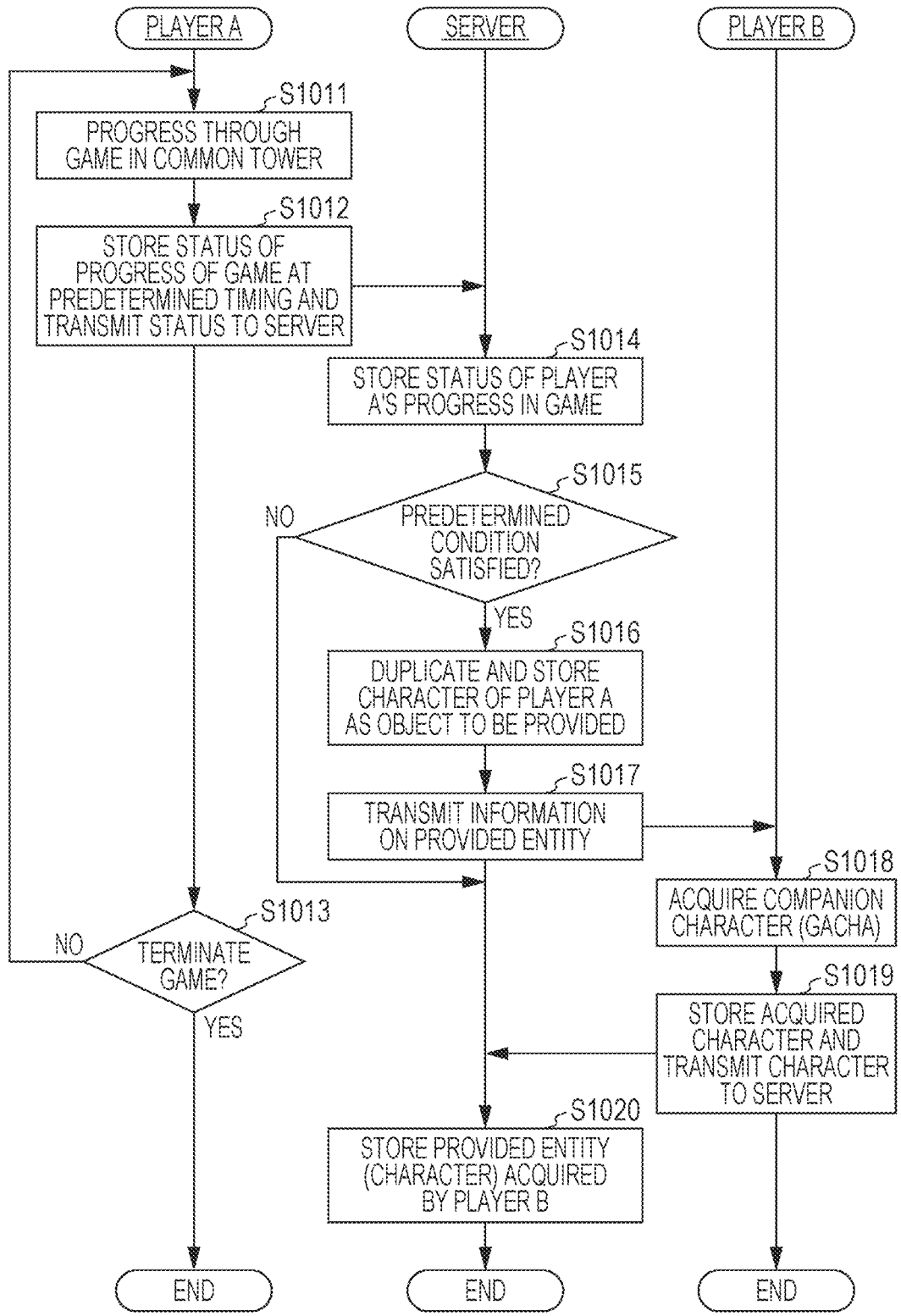
FIG. 24 is a flowchart illustrating a process in a game according to the second embodiment of the present invention.

Turning now to FIG. 24, a process in the game according to the second embodiment of the present invention may be described using a flowchart. FIG. 24 is a flowchart illustrating an example of a process for storing the player character A of the player A of the mobile terminal 100A as a provided entity and sending a request from the player B of the mobile terminal 100B to acquire a companion character (summon a companion character, play a "gacha"). In the following, each component of the mobile terminal 100B of the player B is identified by the corresponding reference numeral accompanied by letter "B". The functions of the individual components of the mobile terminal 100B are similar to those of the mobile terminal 100A described above.

According to an exemplary embodiment, as illustrated in FIG. 24, the progress unit 153 of the mobile terminal 100A may cause the player A to progress through a game in the common tower in accordance with operation input information from the player A through the input acceptance unit 130 (step S1011). Then, the status of the progress of the game in the common tower may be stored in the game information storage unit 161 at predetermined timing (e.g., at 0:00 am on the last day every month or 0:00 am every Sunday). The stored status of the progress of the game may include information such as the number of coins acquired in the common tower, the number of times the player A has visited the common tower, the maximum number of floors reached, or the equipment of the player character A. The status of the progress of the game is transmitted to the server 200 via the communication unit 110 (step S1012). The server 200 may store the status of the player A's progress in the game, which is received by the communication unit 210, in the game information storage unit 264 (step S1014). A plurality of players of the game transmits the statuses of their progress through the game to the server 200, and the server 200 table that stores the status the players' progress through the game in the game information storage unit 264.

Then, the determination unit 256 of the server 200 may determine whether or not the player A satisfies a predetermined condition, that is, whether or not the player A is ranked in top 100 according to the score of the game in the common tower (e.g., the number of coins acquired) (step S1015). If the player A satisfies the predetermined condition, the duplication unit 257 duplicates the player character A and stores the duplicate character in the to-be-provided object storage unit 265 (step S1016). If it is determined in step S1015 that the player A does not satisfy the predetermined condition, information concerning the player character A may be deleted from the game information storage unit 264. The server 200 performs the process described above on each of the players of the game to duplicate player characters ranked in top 100 for the game in the common tower, and stores the duplicate characters in the to-be-provided object storage unit 265.

The selection unit 258 of the server 200 may transmit provided-entity information concerning the provided entities (the duplicates of the player characters) stored in the to-be-provided object storage unit 265 to the mobile terminal 100B via the transmitting unit 212 (step S1017). The transmitted provided-entity information may include information concerning the player characters to be provided, the random lottery rates set for the provided entities, and the top-ranked players. Then, the receiving unit 111B of the mobile terminal 100B receives the provided-entity information and stores the provided-entity information in the storage unit 160B. Thereafter, on the mobile terminal 100B, the player B may select "summon a companion character", and the selection unit 158B plays a random lottery ("gacha") for a companion character in accordance with the provided-entity information (step S1018), which may result in player B obtaining a companion character matching the provided-entity information. The information on the companion character selected (acquired) in step S1018 is transmitted to the server 200 from the transmitting unit 112B (step S1019). Thereafter, the information concerning the provided entity acquired by the player B is stored in the storage unit 260 of the server 200 in association with the player B (step S1020).

Figure 25:
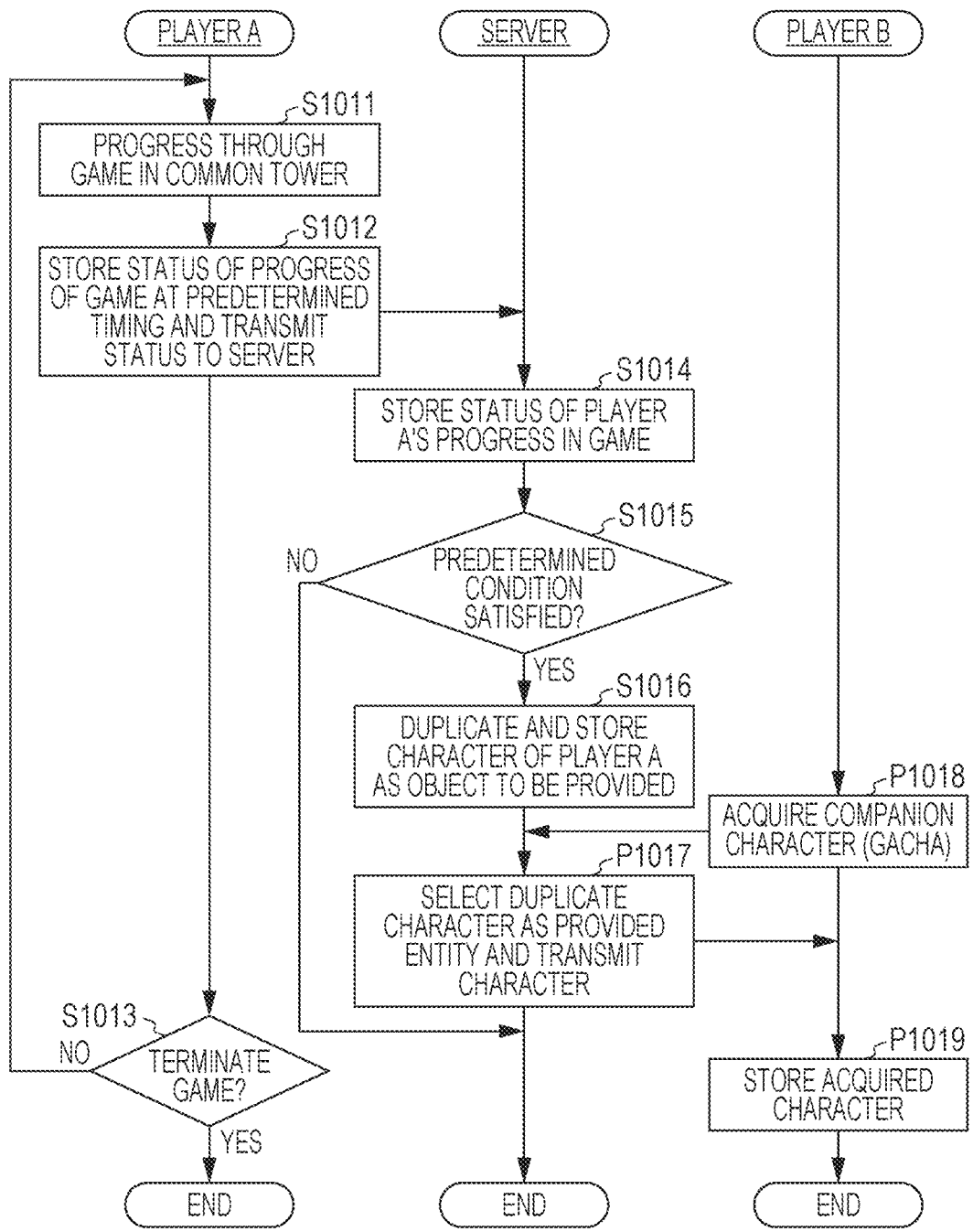
FIG. 25 is a flowchart illustrating a process in the game according to the second embodiment of the present invention.

While the configuration in which the mobile terminal 100B performs a random lottery has been described, according to another exemplary embodiment, the server 200 may perform a random lottery. The process for this operation may be described with reference to a flowchart illustrated in FIG. 25. The processes of steps S1011 to S1016 are similar to those in the flowchart illustrated in FIG. 24, and are not described here. In step P1018, on the mobile terminal 100B, the player B selects "summon a companion character", and the information processing unit 151B transmits an acquisition request to the server 200 via the communication unit 110B. The selection unit 258 of the server 200 selects a provided entity from among the objects to be provided (the duplicates of the player characters) stored in the to-be-provided object storage unit 265, and transmits the provided entity to the mobile terminal 100B via the communication unit 210 (step P1017). The provided entity (duplicate player character) transmitted from the server 200 is stored in the game information storage unit 161B of the mobile terminal 100B (step P1019).

Figure 26:
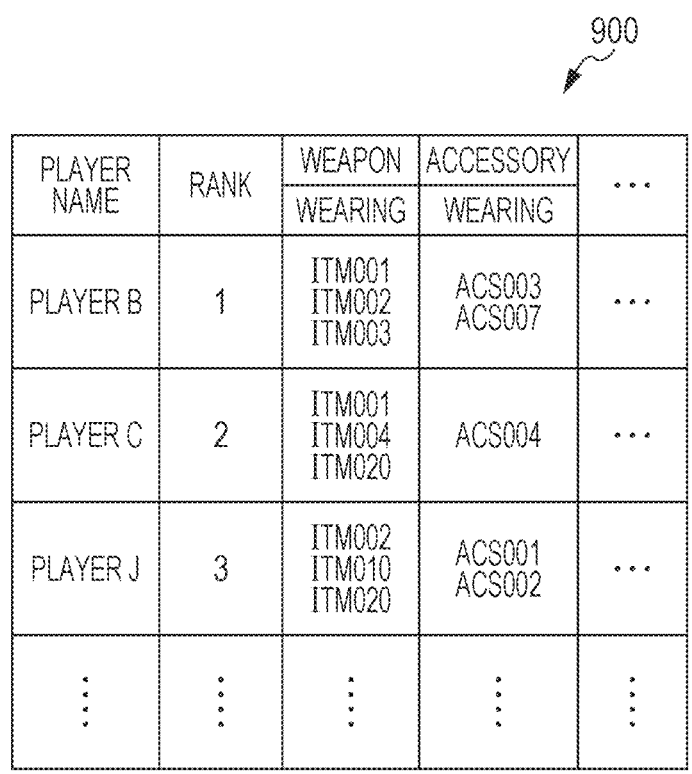
FIG. 26 illustrates an example of a table illustrating information on provided entities.

Turning now to FIG. 26, the information on the provided entities (the duplicates of the player characters) that may be stored in the to-be-provided object storage unit 265 of the server 200 may be described with reference to the drawings. FIG. 26 illustrates an example of a table illustrating information on provided entities stored in the to-be-provided object storage unit 265. As illustrated in FIG. 26, a table 900 may include a "player name", a "rank", a "weapon", and an "accessory". In the illustrated example, the player B is ranked first, and types of weapons and accessories with which the player character B is equipped when the player character B is duplicated as a provided entity and is stored in the to-be-provided object storage unit 265 are stored. According to an exemplary embodiment, the table 900 may further store the probability of occurrence of each player character in a lottery, if the probability of occurrence of each player character differs.

Advantages achievable by some exemplary embodiments will be described again. As described above, according to an exemplary embodiment, a player's player character which satisfies a predetermined condition at predetermined timing may be set as a provided entity through a random lottery ("gacha") for a game in a game space (the common tower 611). Since a provided entity is set at predetermined timing, the player's enthusiasm for the game can be aroused to encourage satisfying the condition by the predetermined timing.

According to an exemplary embodiment, a player may enjoy advantages from acquiring a player character. High-ranked characters may be characters effective on the current game specifications. Accordingly, effective game characters may be easily available to a player among characters raised by other players. An advantage of a player who raises a player character stored as a provided entity is as follows. A character raised by a player is usable by a larger number of other players, allowing the player to interact with other players. In the related art, a player needs to directly fight against other players or access other players to exchange player characters. Some exemplary embodiments may enable player characters to be exchanged between players without requiring the players to directly interact such as fighting each other. This can encourage players to interact via player characters, increasing the opportunity for interaction.

According to an exemplary embodiment, since a companion character acquired through a random lottery will be associated with a high-ranked player (high-score player) of the game in the common tower, a player can easily acquire a high-ability companion character. This can provide the player with an enhanced entertaining game experience. In addition, the player may be motivated to increase the ability of their character so that the character can be registered as a provided entity in order to receive the honor of being used as a companion character or obtain a reward. Accordingly, the player can be motivated to repeatedly play the game.

According to another exemplary embodiment, furthermore, restrictive modification of the parameters of a companion character which has been acquired can suppress proliferation of strong player characters to appropriately maintain the game balance. Specifically, some limitations on an acquirable player character with respect to an original player character that is the source of the player character can guarantee the superiority of a player who owns the original player character. This may allow an increase in the strength of a player such as a novice, and also allows adjustment of the strength of players so that such a player does not easily achieve strength comparable to experts.

According to another exemplary embodiment, furthermore, each player can obtain a reward in accordance with the number of times a duplicate of their player character has been acquired as a companion character or in accordance with the use conditions as a companion character in the game. This can keep the player's enthusiasm for repeated play of the game to increase their ranking.

Other exemplary embodiments other than what has been so far described may be understood. For example, in the foregoing description, the probability of occurrence for a random lottery is set in advance. However, the probability of occurrence may be set in accordance with a predetermined probability distribution from the highest rank. For example, the probability of occurrence of a player character ranked first may be lowest, whereas the probability of occurrence of a player character ranked 100th may be highest. Alternatively, the probability may be changed in accordance with the relationship between a player who plays a gacha and a player corresponding to a player character included in the gacha. The probability of the player A being able to acquire the player character of the player B may be increased in accordance with relationships, for example, the player A having a friendship with the player B or the player A being able to visit the player B's tower or having conquered the player B's tower.

In addition, according to an exemplary embodiment, a plurality of player characters may be associated with a player. In this case, player characters stored as objects to be provided may be some or all of a plurality of player characters associated with a player. Furthermore, the duplication unit 257 may selectively store a player character as a provided entity in accordance with the parameters of each of the plurality of player characters. For example, a player character having a highest parameter among the plurality of player characters may be duplicated and the duplicate character may be used as an object to be provided.

In the foregoing description, furthermore, a provided entity is determined at predetermined timing. In another exemplary embodiment, a player character may be added to a provided entity, as necessary, at the timing when the player character satisfies a condition. For example, at the timing when a player is ranked in top 100, the player's player character may be stored in the server 200. Further, at the timing when a player is removed from the ranking, the player's player character may be deleted from the server 200. With this configuration, player characters included in provided entities can be changed in flux.

The predetermined timing is not limited to that described above, and may be the timing at which the game configuration is changed (e.g., when an event starts, when an event ends, or when an update occurs). The provided entities stored in the server 200 may be replaced periodically.

In the foregoing description, furthermore, a player may be restricted from modifying some of the parameters of a companion character that the player has acquired (e.g., equipment of weapons or accessories). In an alternative exemplary embodiment, restrictions may be imposed on parameters that can be changed. For example, each player can spend coins to increase the weapon skill level, and the upper limit of the weapon skill level that can be increased may be restricted. Alternatively, the initial parameters of a companion character when the companion character is acquired may be set lower than the parameters before the duplication.

The foregoing description has been given of an exemplary embodiment in which a computer functions as a server, a game program serves as a so-called web application (web game), part or all of the game program being executed by the server, and the result of the executed process is returned to a mobile terminal. However, other exemplary embodiments of a computer and game program may be understood. For example, according to one exemplary embodiment, a computer may function as a mobile terminal (client device), and a game program may be executed by the mobile terminal as a so-called native application (native game).

According to an exemplary embodiment where the result of the game is displayed through a web browser, the mobile terminal 100A can accumulate information received from the server 200 in, for example, a predetermined storage area (web storage) included in the web browser.

In this manner, a configuration may be used in which some or all of the functional units (particularly, the control unit 150) included in the mobile terminal 100A in the foregoing description may be included in the server 200, and wherein the server 200 transmits the output result of the game to the mobile terminal 100A in accordance with input given to the mobile terminal 100A. This configuration allows the server 200 to achieve advantages similar to those achievable by the mobile terminal 100A when the mobile terminal 100A provides the individual functions.

In some further examples, a game may be a hybrid game in which some of the processes are performed by each of the server 200 and the mobile terminal 100A in such a manner that, for example, a game progress screen is displayed on the mobile terminal 100A on the basis of the data generated by the server 200 in web display mode and other menu screens and the like are displayed in native display mode by using a native application installed on the mobile terminal 100A.

In addition, according to an exemplary embodiment, the mobile terminal 100A and other mobile terminals, e.g., the mobile terminals 100B and 100C, may be connected to each other so as to be capable of performing communication (called peer-to-peer communication), and may be synchronized with each other to provide multiplayer gameplay. While the configuration in which information is transmitted and received from one mobile terminal to another mobile terminal via the server 200 has been described, information may be directly transmitted and received between mobile terminals in an ad hoc mode or an infrastructure mode, for example.

In addition, the control method described above may not only include the processes described above with reference to the flowcharts but may also optionally include processes executed by the components included in the control unit 150.

In the foregoing description, a game implemented by a game program according to an embodiment of the present invention has been described in the context of a battle game in a tower setting. However, according to other exemplary embodiments, and a game program according to an embodiment of the present invention may be implemented as any of a wide variety of games, examples of which include business simulation games, farm simulation games, and character-raising games.

In the foregoing description, furthermore, a game in which players' scores that determine provided entities are determined is a game in the common tower. However, the present invention is not limited to this configuration, and provided entities may be based on the scores of the player of games in players' towers associated with a plurality of players. In the foregoing description, furthermore, a companion character to be summoned is a player character duplicated as a provided entity. Alternatively, a companion character may be a non-player character programmed in advance. Furthermore, a companion character that appears together with a subject player character, which is acquired through a random lottery, may be the subject player character if the subject player character has been duplicated as a provided entity.

Furthermore, the mobile terminals 100A to 100C are not limited to smartphones. Each of the mobile terminals 100A to 100C may be any device so long as the device is an information processing device capable of implementing the functions described in the second embodiment described above, and examples of the device may include a mobile phone, a PC, and a tablet terminal. Furthermore, while the embodiment described above has been described in the context of a game across three mobile terminals, the present invention is not limited to this embodiment and more than three mobile terminals may be used.

Furthermore, the control units 150 and 250 of the mobile terminal 100A and the server 200 may be each implemented by a logic circuit (hardware) mounted on an integrated circuit (IC) chip or the like, or may be implemented by software by using a CPU. In the latter case, each of the mobile terminal 100A and the server 200 may include a CPU that executes a command of a game program, which is software implementing the individual functions, a ROM or a storage device (collectively referred to as a "recording medium") on which the game program and various kinds of data are recorded in computer-readable (or CPU-readable) form, a RAM onto which the game program is loaded, and so forth. The computer (or CPU) may read the game program from the recording medium and executes the game program. Examples of the recording medium described above may include "non-transitory tangible media", such as a tape, a disc, a card, a semiconductor memory, and a programmable logic circuit. The game program may be supplied to the computer via any type of transmission medium (such as a communication network or broadcast waves) capable of transmitting the game program. According to an exemplary embodiment, this may include data signals embedded in a carrier wave in which the game program is embodied by electronic transmission.

The game program described above may be implemented by using a script language such as ActionScript or JavaScript (®), an object-oriented programming language such as Objective-C or Java®, a markup language such as HTML5, or any other suitable language. Furthermore, according to an exemplary embodiment, a game system may include an information processing terminal (e.g., the mobile terminal 100A) which includes components implementing the respective functions implemented by the game program described above, and a server may include components implementing other functions different from the functions described above.

While the present invention has been illustrated and described in connection with the drawings and embodiments thereof, it should be appreciated that a person skilled in the art could, in light of the teachings of the present disclosure, readily make a variety of changes and modifications. It should therefore be noted that such changes and modifications fall within the scope of the present invention. For example, functions included in means, steps, and the like are reconfigurable so that logical consistency may be maintained, and a plurality of means, steps, and the like may be combined into a single one or divided into multiple ones. In addition, the configurations illustrated in the embodiment described above may be combined as necessary.

Exemplary embodiments such as those described above may be widely applicable to any kind of computer such as a smartphone, a tablet terminal, a mobile phone, a home game console, a personal computer, a server, a workstation, or a mainframe.

What is claimed is:

1. A computer-implemented method, comprising executing on a processor the steps of:
    storing, in a storage module, a subject player game area associated with a subject player in a plurality of players;
    transmitting map information relating to the subject player game area to a display terminal of at least one player other than the subject player in the plurality of players;
    adding, to a map of the at least one player other than the subject player, the subject player game area;
    enabling access, by the at least one player other than the subject player, to the subject player game area, on the display terminal of the subject player, wherein enabling access comprises adjusting a display state of the subject player game area from a non-displayed state to a displayed state;
    defining, prior to the at least one player other than the subject player entering the subject player game area, a relation of the at least one other player to the subject player game area;
    receiving, from the at least one player in the plurality of players other than the subject player, other player progress information relating to progress of the at least one player other than the subject player in the subject player game area, and determining a comparison result based on the other player progress information;
    determining, based on the other player progress information and the comparison result, that the at least one other player is eligible for a reward, and defining the reward based on a relation of the at least one other player to the subject player game area, said reward defined before the at least one other player enters the subject player game area and comprising a first item usable in the game; and
    providing the reward to the at least one other player.

2. The computer-implemented method of claim 1, wherein the reward is a reward which is at least partially different for each of a plurality of game areas and which is specific to the subject player game area.

3. The computer-implemented method of claim 1, further comprising:
    receiving, with the processor, a status of progress of the subject player through the game in another game area, and
    determining, with the processor, a reward to be provided to another player in the plurality of players who progresses through the game in the subject player game area, the reward to be provided being based on the status of progress of the subject player through the game in the another game area.

4. The computer-implemented method of claim 3, wherein the another game area is associated with the another player in the plurality of players.

5. The computer-implemented method of claim 3, wherein the status of progress of the subject player comprises persistent progress information including at least one of: a number of floors reached, a number of coins acquired, an item acquired, or a number of visits.

6. The computer-implemented method of claim 1, further comprising:
    storing, in the storage module, at least one stage of the subject player game area;
    comparing, with the processor, for each of the players other than the subject player in the plurality of players, a stage of the game area associated with the player and the at least one stage of the subject player game area;
    determining, with the processor, a player in the plurality of players associated with another game area having a stage satisfying a predetermined condition with respect to the at least one stage of the subject player game area; and
    transmitting information relating to the at least one subject game area to the player in the plurality of players associated with another game area having the stage satisfying the predetermined condition with respect to the at least one stage of the subject player game area.

7. The computer-implemented method of claim 1, wherein the steps of claim 1 comprise the instructions of a game program, and further comprising:
    transmitting to another player associated with the subject player, on a service other than a service configured to execute the instructions of the game program, information relating to the subject player game area.

8. The computer-implemented method of claim 7, wherein the service other than the service configured to execute the instructions of the game program is a social networking service, and wherein the information relating to the subject player game area is a social media post.

9. The computer-implemented method of claim 1, further comprising:
    transmitting, to the subject player, information relating to a game area associated with a second player, based on a status of progress of the second player through the game in the subject player game area.

10. The computer-implemented method of claim 1, further comprising:
    receiving, with the processor, information relating to the game, comprising progress of the subject player through the game;
    wherein the information is received at a periodic interval.

11. The computer-implemented method of claim 10, wherein the periodic interval is provided by one or more of:

a timing at which the subject player progresses to a different height stage of a game area;
a timing at which the subject player finishes the game; and
a timing at which the subject player logs out of the game.

12. The computer-implemented method of claim 1, further comprising:
    enabling access, by the subject player, to an area other than the subject player game area based on a state of the subject player game area, said area other than the subject player game area providing a competitive mode; and
    selecting an opponent, in the competitive mode, for the subject player based on the state of the subject player game area and a comparison of the state of the subject player game area to a game area associated with the opponent.

13. The computer-implemented method of claim 12, further comprising:
    receiving, from at least one social networking service, one or more friends of the subject player; and
    providing, on the graphical user interface, a ranking of the subject player amongst the one or more friends of the subject player.

14. The computer-implemented method of claim 13, further comprising:
    determining at least one item owned by the subject player; and
    equipping, on the enemy character in the subject player game area, the at least one item.

15. The computer-implemented method of claim 1, further comprising:
    outputting display information for displaying, on the graphical user interface, a ranking of the subject player amongst the plurality of players.

16. The computer-implemented method of claim 1, further comprising:
    providing, as an enemy character in the subject player game area, a duplicate of a player character of the subject player.

17. The computer-implemented method of claim 1, further comprising:
    providing, in the storage module, a plurality of predetermined achievement lists; and
    associating at least one first predetermined achievement list in the plurality of achievement lists with a subject player, and associating at least one second predetermined achievement list in the plurality of achievement lists with at least one player other than the subject player, wherein the at least one second predetermined achievement list is different from the at least one first predetermined achievement list.

18. A computer program product embodied on a non-transitory computer readable medium, comprising code executable by a computer arranged to operate a computer game, to cause the computer to carry out steps of:
    storing, in a storage module, a subject player game area associated with a subject player in a plurality of players;
    transmitting map information relating to the subject player game area to a display terminal of at least one player other than the subject player in the plurality of players;
    adding, to a map of the at least one player other than the subject player, the subject player game area;
    enabling access, by the at least one player other than the subject player, to the subject player game area, on the display terminal of the subject player, wherein enabling access comprises adjusting a display state of the subject player game area from a non-displayed state to a displayed state;
    defining, prior to the at least one player other than the subject player entering the subject player game area, a relation of the at least one other player to the subject player game area;
    receiving, from the at least one player in the plurality of players other than the subject player, other player progress information relating to progress of the at least one player other than the subject player in the subject player game area, and determining a comparison result based on the other player progress information;
    determining, based on the other player progress information and the comparison result, that the at least one other player is eligible for a reward, and defining the reward based on a relation of the at least one other player to the subject player game area, said reward defined before the at least one other player enters the subject player game area and comprising a first item usable in the game; and
    providing the reward to the at least one other player.

19. A system comprising at least one processor, at least one storage module including computer program code, and at least one display terminal of a player having a graphical user interface, the at least one storage module and the computer program code configured to, with the at least one processor, cause the system to perform steps of:
    storing, in the storage module, a subject player game area associated with a subject player in a plurality of players;
    transmitting map information relating to the subject player game area to a display terminal of at least one player other than the subject player in the plurality of players;
    adding, to a map of the at least one player other than the subject player, the subject player game area;
    enabling access, by the at least one player other than the subject player, to the subject player game area, on the display terminal of the subject player, wherein enabling access comprises adjusting a display state of the subject player game area from a non-displayed state to a displayed state;
    defining, prior to the at least one player other than the subject player entering the subject player game area, a relation of the at least one other player to the subject player game area;
    receiving, from the at least one player in the plurality of players other than the subject player, other player progress information relating to progress of the at least one player other than the subject player in the subject player game area, and determining a comparison result based on the other player progress information;
    determining, based on the other player progress information and the comparison result, that the at least one other player is eligible for a reward, and defining the reward based on a relation of the at least one other player to the subject player game area, said reward defined before the at least one other player enters the subject player game area and comprising a first item usable in the game; and
    providing the reward to the at least one other player.

\* \* \* \* \*